(12) United States Patent
Schneier et al.

(10) Patent No.: US 7,887,405 B2
(45) Date of Patent: *Feb. 15, 2011

(54) OFF-LINE REMOTE SYSTEM FOR LOTTERIES AND GAMES OF SKILL

(75) Inventors: Bruce Schneier, Minneapolis, MN (US); Jay S. Walker, Ridgefield, CT (US); James Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/426,963

(22) Filed: Jun. 28, 2006

(65) Prior Publication Data

US 2006/0246999 A1 Nov. 2, 2006

Related U.S. Application Data

(63) Continuation of application No. 11/304,103, filed on Dec. 15, 2005, now Pat. No. 7,285,045, which is a continuation of application No. 11/057,665, filed on Feb. 14, 2005, now Pat. No. 7,008,318, which is a continuation of application No. 10/620,260, filed on Jul. 15, 2003, now Pat. No. 6,942,570, which is a continuation of application No. 10/145,964, filed on May 14, 2002, now Pat. No. 6,607,439, which is a continuation of application No. 09/063,590, filed on Apr. 21, 1998, now Pat. No. 6,402,614, which is a continuation of application No. 08/624,998, filed on Mar. 29, 1996, now Pat. No. 5,871,398, which is a continuation-in-part of application No. 08/497,080, filed on Jun. 30, 1995, now abandoned.

(51) Int. Cl.
*A63F 9/24* (2006.01)
*G06F 17/00* (2006.01)
*G06F 19/00* (2006.01)

(52) U.S. Cl. .............................. 463/17; 463/25; 463/42; 273/269; 379/93.13

(58) Field of Classification Search .................... 463/1, 463/9–13, 16–20, 25–30, 36, 39–43; 273/269, 273/236–237, 292–293, 138.1, 138.2, 138.3, 273/139; 379/90.01, 93.01, 93.13; 700/91–93
See application file for complete search history.

(56) References Cited

U.S. PATENT DOCUMENTS 4,157,829 A    6/1979    Goldman et al. ........ 273/138 A (Continued)

FOREIGN PATENT DOCUMENTS

EP    0 032 410    7/1981

(Continued)

OTHER PUBLICATIONS

"Harrah's Reno Uses Hybrid ISDN to Attract Customers", Viewtext, Mar. 1989, Vo. 10, No. 3, ISSN: 0275-0686, 2pp.

(Continued)

*Primary Examiner*—M. Sager
(74) *Attorney, Agent, or Firm*—Fincham Downs LLC; Michael D. Downs

(57) ABSTRACT

An off-line remote lottery system which enables players to purchase instant-type lottery game outcomes from a randomized prize data stream in a central computer, and view the outcomes on remotely disposed gaming computers which do not require an on-line connection during play.

10 Claims, 13 Drawing Sheets

U.S. PATENT DOCUMENTS

| | | | | |
|---|---|---|---|---|
| 4,317,957 | A | 3/1982 | Sendrow | 178/22.08 |
| 4,494,197 | A | 1/1985 | Troy et al. | 364/412 |
| 4,652,998 | A | 3/1987 | Koza et al. | 364/412 |
| 4,689,742 | A | 8/1987 | Troy et al. | 364/412 |
| 4,760,527 | A | 7/1988 | Sidley | 364/412 |
| 4,764,666 | A | 8/1988 | Bergeron | 235/380 |
| 4,842,278 | A | 6/1989 | Markowicz | 273/138 A |
| 4,856,787 | A | 8/1989 | Itkis | 273/237 |
| 4,982,337 | A | 1/1991 | Burr et al. | 364/479 |
| 5,038,022 | A | 8/1991 | Lucero | 235/380 |
| 5,042,809 | A | 8/1991 | Richardson | 273/138 A |
| 5,069,453 | A | 12/1991 | Koza et al. | 273/139 |
| 5,083,271 | A | 1/1992 | Thacher et al. | 364/411 |
| 5,096,195 | A | 3/1992 | Gimmon | 273/138 A |
| 5,119,295 | A | 6/1992 | Kapur | 364/412 |
| 5,179,517 | A | 1/1993 | Sarbin et al. | 364/410 |
| 5,223,698 | A | 6/1993 | Kapur | 235/375 |
| 5,239,165 | A | 8/1993 | Novak | 235/375 |
| 5,276,312 | A | 1/1994 | McCarthy | 235/380 |
| 5,277,424 | A | 1/1994 | Wilms | 273/85 CP |
| 5,283,734 | A | 2/1994 | Von Kohorn | 364/412 |
| 5,297,802 | A * | 3/1994 | Pocock et al. | 463/19 |
| 5,324,035 | A | 6/1994 | Morris et al. | 273/138 A |
| 5,330,185 | A | 7/1994 | Wells | 273/138 A |
| 5,351,970 | A | 10/1994 | Fioretti | 273/439 |
| 5,380,007 | A | 1/1995 | Travis et al. | 273/138 A |
| 5,398,932 | A | 3/1995 | Eberhardt et al. | 273/138 A |
| 5,413,357 | A | 5/1995 | Schulze et al. | 273/436 |
| 5,415,416 | A | 5/1995 | Scagnelli et al. | 273/439 |
| 5,417,424 | A | 5/1995 | Snowden et al. | 273/138 A |
| 5,436,967 | A | 7/1995 | Hanson | 379/266 |
| 5,518,253 | A | 5/1996 | Pocock et al. | 273/439 |
| 5,569,082 | A | 10/1996 | Kaye | 463/17 |
| 5,618,232 | A * | 4/1997 | Martin | 463/17 |
| 5,709,603 | A | 1/1998 | Kaye | 463/17 |
| 5,768,382 | A | 6/1998 | Schneier et al. | 380/23 |
| 5,779,549 | A | 7/1998 | Walker et al. | 463/42 |
| 5,871,398 | A | 2/1999 | Schneier et al. | 463/16 |
| 5,970,143 | A | 10/1999 | Schneier et al. | 380/23 |
| 6,024,640 | A | 2/2000 | Walker et al. | 463/17 |
| 6,402,614 | B1 | 6/2002 | Schneier et al. | 463/17 |
| 6,527,638 | B1 * | 3/2003 | Walker et al. | 463/25 |
| 6,607,439 | B2 * | 8/2003 | Schneier et al. | 463/17 |
| 6,942,570 | B2 * | 9/2005 | Schneier et al. | 463/17 |
| 7,008,318 | B2 * | 3/2006 | Schneier et al. | 463/17 |
| 7,285,045 | B2 * | 10/2007 | Schneier et al. | 463/17 |
| 7,303,468 | B2 * | 12/2007 | Schneier et al. | 463/17 |
| 2002/0090986 | A1 | 7/2002 | Cote et al. | 463/16 |
| 2006/0246998 | A1 * | 11/2006 | Schneier et al. | 463/17 |
| 2006/0247000 | A1 * | 11/2006 | Schneier et al. | 463/17 |

FOREIGN PATENT DOCUMENTS

| | | |
|---|---|---|
| EP | 0 106 187 B1 | 11/1985 |
| EP | 0 405 776 A2 | 1/1991 |
| EP | 0 478 412 A1 | 4/1992 |
| EP | 0 487 446 A2 | 5/1992 |
| FR | 2 697 653 A1 | 5/1994 |
| GB | 2 121 569 A | 12/1983 |
| GB | 2 148 135 A | 5/1985 |
| JP | 01258178 A | 10/1989 |
| JP | 01269158 A | 10/1989 |
| JP | 01269164 A | 10/1989 |
| JP | 01316869 | 12/1989 |
| JP | 02110660 A | 4/1990 |
| JP | 03269763 | 12/1991 |
| JP | 06-35944 | 2/1994 |
| WO | WO 86/02752 | 5/1986 |
| WO | WO 92/16914 | 10/1992 |
| WO | WO 93/19428 | 9/1993 |
| WO | WO 94/19906 | 9/1994 |
| WO | WO 95/05876 | 3/1995 |
| WO | WO 96/00950 * | 1/1996 |

OTHER PUBLICATIONS

"Agent Speaks Directly to the Customer on the Screen", ISND News, Mar. 1, 1989, vol. 2, No. 4, ISSN: 0899-9554, 2pp.

Conniff, Michael, "Don't Bet Against Harrah's When it Comes to ISDN", Electronic Service Update, May 1, 1989, vol. 2, No. 5, 3pp.

Brochure: "Oasis Electronic Pull-Tab Network", Copyright 1993, Infinational Technologies, Inc, 9pp.

"Interactive Network (IN) announced Tues . . . ", Communications Daily, Nov. 30, 1994, vol. 14, No. 230, ISSN: 0277-0679, 1pg.

"Interactive Network Sets Up Gaming Subsidiary", Interactive Facts, Dec. 1994, vol. 1, No. 25, 2pp.

"Interactive Network Launches Wagering Unit", Multimedia Business Report, Dec. 2, 1994, ISSN: 1065-8300, 1pg.

"Interactive Network Forms Real-Time Gambling Subsidiary", Newsbyte News Network, Dec. 7, 1994, 2pp.

Dvorak, John C., "Gambling on a PC near you.", PC Magazine, May 16, 1995, vol. 14, No. 9, p. 89, ISSN: 0888-8507, 1pg.

Office Action for U.S. Appl. No. 08/497,080, mailed Jan. 17, 1997, 1 pg.

Notice of Allowability for U.S. Appl. No. 08/624,988, mailed May 20, 1998, 1 pg.

Office Action for U.S. Appl. No. 09/063,590 mailed Jun. 7, 2001, 7 pp.

Notice of Allowability for U.S. Appl. No. 09/063,590 mailed Jan. 7, 2002, 1 pg.

Notice of Allowability for U.S. Appl. No. 10/145,964 mailed Mar. 19, 2003, 2 pp.

Office Action for U.S. Appl. No. 10/145,964 mailed Nov. 6, 2002, 2001, 5 pp.

Notice of Allowance for U.S. Appl. No. 10/620,260 mailed Sep. 28, 2004, 4 pp.

Office Action for U.S. Appl. No. 10/620,260 mailed Jun. 17, 2004, 4 pp.

Notice of Allowance for U.S. Appl. No. 11/304,103 mailed Aug. 21, 2007, 6 pp.

Notice of Allowance for U.S. Appl. No. 11/426,959 mailed Oct. 1, 2007, 6 pp.

Office Action for U.S. Appl. No. 11/426,997 mailed Jan. 8, 2009, 7 pp.

Notice of Acceptance for Australian Application No. 52850/98 mailed Aug. 18, 2000, 2 pp.

Office Action for Australian Application No. 52850/98 mailed Dec. 13, 1999, 2 pp.

Office Action for Australian Application No. 52850/98 mailed 02/02/99, 2 pp.

Notice of Acceptance for Australian Application No. 7706/98 mailed Jan. 13, 2004, 1 pg.

Office Action for Australian Application No. 7706/98 mailed Jan. 13, 2003, 1 pg.

Office Action for Australian Application No. 7706/98 mailed Apr. 29, 2002, 2 pp.

European Search Report for European Application No. 96 92 3577 mailed May 4, 2000, 3 pp.

Office Action for European Application No. 96 92 3577 mailed May 26, 2003, 4 pp.

Decision to Grant European Application No. 96 92 3577 mailed Apr. 26, 2007, 1 pp.

Office Action for Japanese Application No. 9-519950 mailed Feb. 8, 2005, 3 pp.

International Search Report for PCT Application No. PCT/US96/11656 mailed Oct. 31, 1996, 3 pp.

* cited by examiner

OFF-LINE REMOTE SYSTEM FOR LOTTERIES AND GAMES OF SKILL

The present application is a continuation of U.S. patent application Ser. No. 11/304,103, entitled "OFF-LINE REMOTE SYSTEM FOR LOTTERIES AND GAMES OF SKILL", filed Dec. 15, 2005 and issued as U.S. Pat. No. 7,285,045 on Oct. 23, 2007;

which is a continuation of U.S. patent application Ser. No. 11/057,665, entitled "OFF-LINE REMOTE SYSTEM FOR LOTTERIES AND GAMES OF SKILL", filed Feb. 14, 2005 and issued as U.S. Pat. No. 7,008,318 on Mar. 7, 2006, in the name of Schneier et al.;

which is a continuation of U.S. patent application Ser. No. 10/620,260 entitled "OFF-LINE REMOTE SYSTEM FOR LOTTERIES AND GAMES OF SKILL", filed Jul. 15, 2003 and issued as U.S. Pat. No. 6,942,570 on Sep. 13, 2005;

which is a continuation of U.S. patent application Ser. No. 10/145,964, filed May 14, 2002 in the name of Schneier et al and which issued as U.S. Pat. No. 6,607,439 B2 on Aug. 19, 2003;

which is a continuation of U.S. patent application Ser. No. 09/063,590 filed Apr. 21, 1998 in the name of Schneier et al. and which issued as U.S. Pat. No. 6,402,614 B1 on Jun. 11, 2002;

which is a continuation of U.S. patent application Ser. No. 08/624,998 filed Mar. 29, 1996 in the name of Schneier et al. and which issued as U.S. Pat. No. 5,871,398 on Feb. 16, 1999;

which is a continuation-in-part of now abandoned U.S. patent application Ser. No. 08/497,080 filed Jun. 30, 1995 in the name of Schneier et al. Each of the above-referenced applications is incorporated by reference herein in its entirety.

BACKGROUND

The present invention relates generally to remote gaming systems, and more particularly, to an off-line system for playing games of chance, including instant-type lottery games typically embodied in a ticket having multiple chances which represent a single predetermined outcome offered by a managing authority are rendered on a gaming computer as an "electronic ticket," such as, for example, a dedicated handheld device or programmed is general personal computer. In addition, the present invention provides for playing games of skill on such a device. In a lottery application, the system enables a player to play instant-type tickets on the game computer with the same convenience as typical paper scratch-off tickets at any location without the gaming computer ever having to be physically or electronically connected to a lottery system network during play, thereby providing enhanced play value for the player and greater revenues for the managing authority.

In the case of typical paper instant tickets, a computer generates a randomized prize data stream comprised of a finite series of win/lose outcomes. Each outcome is assigned to a lottery ticket, and each ticket contains one or more game chances which yield the assigned outcome. The player cannot change the ticket outcome, he or she merely scratches off certain areas of the ticket in accordance with the rules of the game to reveal the outcome. The ticket contains indicia which provide the player with a means to determine win/lose results or prize status, and the type of prize (e.g., cash or a free ticket). The aggregate of all winning outcomes in any randomized prize data stream is a predetermined percentage payout of the total revenues that would be generated by the sale of all of the tickets incorporating that particular randomized prize data stream.

In one specific embodiment of prior art paper instant ticket systems, ticket outcomes are generated by the computer tapes that control printing of the tickets. These tapes contain an outcome for any given run of tickets. The outcomes are created using essentially similar methods throughout the industry. For example, a run of 24 million tickets that has 120 top payouts of $10,000 and a payout percentage of 55%, may be broken up into 100 blocks of 240,000 tickets each. The $10,000 winners will be distributed as evenly as possible among the 100 blocks, so there will be at least one top prize in each block, with 20 blocks having two top prizes. The 80 blocks without the two top prizes will be compensated by offering more low and mid-tier prizes, so that the payout percentage is exactly 55% for each 240,000 ticket block. Each of these 240,000 ticket blocks is broken up into books of tickets, typically 200 to 400 tickets per book. Tickets are delivered to retailers in book units, where each ticket has two identifying numbers, a book/ticket number and a validation number. The book/ticket number is usually printed on the back of the ticket. An exemplary book ticket number is "089-46127-234." The "089" identifies the game, in this case a State X $3 "Win for Life." The "46127" is the book number, which in this case means that this ticket is from book number 46127. The "234" identifies this ticket as the 234th ticket from this book. The validation number is printed under the latex surface on the front of the ticket. This number is the key to determining whether or not the ticket is a winner. When a winning ticket is presented for prize redemption, the retailer types this number into an agent terminal, from which access to a central database of instant tickets provided by the ticket printer is obtained to search the record of outcomes for that run of tickets. This database resides in a separate computer at the main computer center of the online service provider (such as GTECH).

To prevent fraud, the Validation number cannot be seen without scratching off the latex covering material. If the validation number were Visible without requiring that the latex be removed first, retailers could check whether or not each ticket was a winner, and then keep winning tickets for themselves, selling only the losing tickets to customers. In, this connection, the validation number is typically comprised of nine (9) digits. An illustrative validation number for the above "Win for Life" ticket is: 71069-7041. This number singularly identifies this ticket from the millions of tickets that are printed for that game. It is important to note that this number is encoded and not in sequential order. If the latter was the case, retailers could buy one ticket for themselves and check its validation number. They could then enter the next ten validation numbers into the online system to determine whether any were winners. Again, customers might be sold the losing tickets while the retailer kept the winners. Encryption prevents this, because knowing one validation number provides the retailer with no information about the next number.

Some lotteries place restrictions on the distribution of outcomes, including limits on the number of high tier winners per book; how many consecutive non-winning tickets Y % of the time; and the maximum number of non-winning tickets per row. In arranging the lottery, the authority decides how many tickets are to be sold, the payback percentage of the game as a whole, and what prizes will be awarded and the frequency of winning tickets among the total number of tickets. For example, if the lottery wanted to sell a total of 20 tickets and have a payout percentage for the game of 50%, they might need to pay $10 total for the game. This might consist of one $5 winner, one $2 winner, and three $1 winners and is may be represented as: 5, 2, 1, 1, 1, 0, 0, 0, 0, 0, 0, 0, 0, 0, 0, 0, 0, 0, 0, 0. Note that the process so far has been completely deterministic. There is no randomness at all. Of course the lottery does not want to have the first five tickets sold to be winners, so it randomizes the order of the tickets. The resulting sequence might look like the following: 0, 0, 0, 0, 0, 1, 0, 2, 0, 0, 5, 0, 0, 0, 0, 1, 0, 0, 0, 1. As tickets are requested by players, they are removed from the sequence of outcomes. From the above set of outcomes, a player requesting four tickets might buy four losers—0, 0, 0, 0. If the next player requested three tickets, he or she may get 0,1,0. The next three tickets sold might be 2,0,0. This process continues until the entire sequence of outcomes is exhausted. Of course the computer can also pull outcome requests from the game sequence at random, so that a request for three outcomes could get the outcomes in location 5, 8, and 11 (which might correspond to 0,2,5). These outcomes would then be eliminated from the game sequence so that the next player cannot get the same sequence.

The lottery ticket may also contain a batch number that is typically visible on the ticket in the form of a bar code. All tickets in a given master carton are part of the same ticket lot and are sold at the same price point. Each master carton is labeled with a unique master carton serial number which is tracked by a central management computer associated with the managing authority. The central management computer also stores every ticket serial number and the associated outcome for that ticket. When the instant tickets are to be sold to customers, the lottery retailer communicates the master carton serial number via his on-line agent terminal to the central management computer and thereby activates all of the paper instant tickets in each master carton. This action activates all of the ticket serial numbers in that master carton, and typically causes the lottery retailer's lottery bank account to be automatically debited for the wholesale cost of that master carton within a specified time period.

To redeem a winning paper lottery ticket, the player presents the same to a redeeming agent, either at a lottery retailer or lottery office, or mails the ticket in for redemption. To effectuate the redemption process, the redeeming agent scans the bar code on the ticket which represents the batch serial number on the ticket through a bar code scanner associated with the agent terminal. The ticket agent also enters the ticket serial number into the agent terminal. These ticket serial numbers are transmitted to the central management computer for purposes of validation. When the central management computer receives a validation request, it activates an on-line validation program which queries a ticket value database using the particular ticket and batch serial numbers to confirm that the ticket came from an activated master carton. If the ticket value database confirms a payout, the validation program authorizes the lottery retailer to pay the player cash or provide another prize (e.g., a tree ticket).

In other paper instant ticket systems, there is no central management computer that manages the system from a purchase and redemption standpoint. The lottery retailer simply buys tickets from a printer, resells them to players, and then handles all aspects of validation and payment of winnings.

All prior art paper instant ticket systems suffer from several drawbacks. These include the costs of printing tickets, the physical inventory costs, the costs to the managing authority and retailer associated with unsold tickets, the inability to effectively offer low-price games (e.g., $0.25, $0.10), the limited game choices for the player, and the stigma associated with paper tickets as appealing toward lower income players, among others.

As an alternative to instant paper tickets, systems have been devised which replicate instant tickets on a computer terminal or gaming machine. An example is shown in U.S. Pat. No. 5,324,035, which discloses an on-line video gaming system comprised of a plurality of slave terminals, a plurality of master processing units, and a central game processor. A plurality of slave terminals are networked to each master processing unit and all of the master processing units are networked to the central game processor. The central game processor downloads fixed pools of game plays to each master processing unit. The slave terminals request game plays from the fixed pool in the master processing unit. The group of slave terminals coupled to a particular master processing unit display indications of the chances of purchasing one of the remaining winning plays in that pool to provide an element of competition between players situated at the various slave terminals. Thus, players at each slave terminal may decide to wait for the odds of purchasing a winning play to increase by allowing other competitors to purchase some of the remaining non-winning plays. Although this system is capable of rendering instant paper tickets in a video format, its primary drawback is that it is a networked on-line system. Every play (outcome) requested by the slave terminal must be downloaded on-line from the master processing unit. Accordingly, this system is limited in that players can only engage in lottery play at specified locations.

Another on-line video gaming system is disclosed in U.S. Pat. No. 4,652,998. This system comprises a plurality of remote terminals networked to a central controller which generates a prize pool based upon a pool seed which is fed to a random number generator. The central controller divides the prize pool into mini-pools, each of which has a known amount of low-end prize value (e.g., all prizes of $25 or less). There are a selected number of larger prizes which are distributed among the mini-pools where some mini-pools have a large prize and some have none. Mini-pools are assigned to each terminal for each game which is rendered on the terminal as needed. The remote terminals have means for randomizing each mini-pool assigned to the terminal using a mini-pool seed provided by the central controller to feed a random number generator using a randomizing algorithm. When the central processor has assigned all mini-pools within a pool, the central processor creates a new pool. After players have played a sufficient number of games to exhaust an entire mini-pool at a given remote terminal, it connects to the central controller and is assigned a new mini-pool. This system also has significant limitations. Because the prize structure in the mini-pools is assigned to each remote terminal in a "dynamic state", i.e., the remote terminal is assigned active outcomes before a player engages in play, it is necessary to provide various security measures in the remote terminals to prevent an unscrupulous player from "looking ahead" by "hacking" the machine and determining the outcome sequence in any given mini-pool. Otherwise, a player might learn at what point in the mini-pool a large win will occur for the game being played and then wait to play until when a favorable outcome is due to occur. This characteristic renders such a system vulnerable to hacking since a player could conceivably view the outcomes stored in the device prior to purchase.

It is therefore desirable to provide an off-line system in which a player can enjoy games having a predefined outcome determined by a managing authority or the like on a gaming device, without the need to be physically or electronically linked to a central management computer associated with the managing authority during play, where "ticket" purchase and redemption of winnings may be done at virtually any location, and where the managing authority is not at risk of being cheated since there are no secrets stored in the device.

SUMMARY OF THE INVENTION

Accordingly, it is a primary object of the present invention to provide a lottery system whereby instant "tickets" or pseudo-choice games with a predetermined outcome can be rendered on a remote gaming computer (the gaming computer may be any personal computer, personal digital assistant or the like, but will be referred to herein as a hand-held ticket viewer "HTV") to enable a player to participate in a lottery or play lottery-type games for prizes at any location, all the while providing enhanced play value through computer simulation of games on the HTV.

It is a further object of the present invention to provide a lottery system which allows for replicating game outcomes on an HTV where the outcomes are predetermined prior to purchase by and stored in a record in a central management computer ("CMC") for the target HTV, thereby eliminating the need for security in the HTV.

It is yet another object of the present invention to provide a lottery system which enables predetermined game outcomes to be rendered on an HTV, yet where prize redemption can be implemented at retailer in the same manner and with the same convenience as instant scratch-off lottery paper tickets.

It is a further object of the present invention to provide a lottery system which confers portability of purchase and redemption via any interactive communications or data network.

It is another object of the present invention to provide a lottery system which provides a managing authority with increased sales and profits, players with more competitive entertainment alternatives and overall higher customer satisfaction.

It is a further object of the present invention to provide a lottery system which eliminates the printing costs, inventory costs and cash flow delays typically associated with instant paper tickets.

It is a further object of the present invention to provide a lottery system which eliminates the disposal costs associated with paper instant tickets.

It is yet another object of the present invention to provide a lottery system in which an HTV provides for increased play value through longer play times than what is possible with instant paper tickets.

It is yet another object of the present invention to provide a lottery system in which games rendered on an HTV may be generated in a large type option which presents larger game formats to make it easier for people with poor vision to play the games.

It is another object of the present invention to provide a lottery system which allows for venue expansion through sales of instant ticket type games in venues where sales of paper tickets are impractical such as in restaurants and the like.

It is still another object of the present invention to provide a lottery system in which game tutorials and help screens on an HTV enable players to learn new lottery games.

It is yet another object of the present invention to provide a lottery system in which games are rendered on an HTV and the machine communicates a winning outcome to the player.

It is a further object of the present invention to provide a lottery system in which new lottery games may be transferred to an HTV through a plug-in module.

It is still another object of the present invention to provide a lottery system in which the managing authority can inexpensively test new games and obtain user feedback by transferring new games for user sampling to an HTV through a plug-in module.

It is yet another object of the present invention to provide a lottery system in which advertising in connection with any lottery game may be transferred to and rendered on an HTV.

It is a another object of the present invention to provide a lottery system in which games that are races of skill, such as crossword puzzles or word descrambler games that must be completed in a certain period of time and which have a known correct solution, are rendered on an HTV.

It is a further object of the present invention to provide a lottery system which realizes increased lottery sales and player game value by providing for the optional reinvestment of winnings by the player in connection with an original "ticket" purchase on an HTV.

It is yet another object of the present invention to provide a lottery system which allows for a managing authority to track players and various attributes of their play, such as, for example, play frequency, betting level, type of games played and the like, to utilize such information to provide various bonus awards and incentives.

It is still another object of the present invention to provide a lottery system which reduces player fatigue by enabling a player to select from a plurality of games on an HTV irrespective of the predetermined outcomes purchased from the managing authority.

It is yet another object of the present invention to provide a lottery system that allows for a plurality of game authorizations/outcomes to be stored in the HTV at the time of manufacture.

It is still another object of the present invention to provide a lottery system in which game outcomes are randomly generated by the central management computer at the time of a purchase request.

It is yet another object of the present invention to provide a lottery system wherein game outcomes are generated in the HTV based upon a random seed value from the central management computer.

It is yet another object of the present invention to provide a lottery system in which a random string of outcomes are stored in the HTV and revealed in response to receipt of address data from the central management computer.

It is another object of the present invention to provide a lottery system in which the HTV enables games of skill to be played where the outcomes of the games are not immediately made known to the player but rather are determined by the central management computer upon receipt of game parameter data from the HTV.

It is still another object of the invention to provide a lottery system for playing probabilistic games of chance on an HTV.

It is a further object of the present invention to provide a lottery system which reduces ticket and validation costs for the managing authority through electronic batching and reduced claim "events."

It is another object of the present invention to provide a lottery system which makes instant ticket type lottery games attractive to a wider group of participants who enjoy playing games on machines and personal computers.

It is a further object of the present invention to provide a lottery system in which an HTV may be enabled for play and disabled in accordance with its location using a Global Positioning System ("GPS") receiver to facilitate in-flight gaming where the HTV may be prevented from operating unless it is located within a venue that allows for gaming.

In accordance with the foregoing objects and additional objects that will become apparent hereinafter, the present invention, in one exemplary embodiment, comprises a system for enabling games of chance for prizes on at least one remote game computer, where each game has at least one associated outcome that is predetermined by a central authority with an associated central management computer that authorizes game play on the remote game computer and provides for verification of the at least one outcome after game play by the central authority. The system generally comprises: at least one game computer including associated memory and processing means for executing at least one program from the associated memory, where the at least one program includes a game program. The processing means execute the game program to enable the player to play at least one game on the game computer upon receipt of outcome and game authorization data pursuant to a purchase request, where the data represent either a single predetermined outcome or an aggregation of constituent outcomes. The game computer further includes authentication means operatively associated therewith for generating and authenticating authenticatable messages utilizing a variety of cryptographic and other protocols.

The invention further includes a central management computer having associated memory, processing means for executing at least one program from the central management computer associated memory, and central management computer authentication means operatively associated therewith for generating and authenticating authenticatable messages. The central management computer enables an authenticated session to communicate the data either via a direct electronic connection or a manually input data step to the game computer to enable the central management computer to authorize game play on the game computer while the game computer is not connected to any other device during play, and thereafter to enable prize redemption.

The present invention also contemplates a method for playing games of chance on at least one remote game computer, where each game has at least one outcome that is predetermined by a central gaming authority having an associated central management computer prior to game play, comprising the steps of:

(a) identifying the game computer to the central management computer;

(b) requesting a number of game authorizations from the central management computer;

(c) the central management computer forming an authenticatable game authorization message representing at least one predetermined game outcome;

(d) communicating the authenticatable game authorization message to the game computer after payment authorization for the authorized games by the player; and (e) the game computer authenticating the authenticatable game authorization message and, if authenticated, allowing the game computer to reveal the at least one predetermined outcome represented in the authenticatable game authorization message.

In another embodiment, the game computer associated memory stores an accumulated cash-balance of winnings, and the authenticatable game authorization message represents a predetermined number of game authorizations in connection with the purchase request, and further represents a predetermined number of standby game authorizations which are played by debiting the accumulated cash-balance.

In accordance with an illustrative embodiment of the invention, prize redemption of winnings associated with the authorized game plays comprises the following additional steps:

(f) identifying the game computer to the central management computer;

(g) the game computer generating an authenticatable redemption request message representing the at least one predetermined game outcome;

(h) communicating the authenticatable redemption request message to the central management computer through at least one of a temporary direct electronic connection and a manually input data step; and (i) the central management computer authenticating the authenticatable redemption request message and verifying outcome data represented therein to outcome data previously transmitted in said authenticatable game authorization message to authorize at least one of a payout of winnings and credit toward additional game authorizations.

The game computer may include an integral or external security token, where the security token comprises a tamper-resistant and/or evident secure perimeter including memory and processing means for executing programs from the secure perimeter memory. The secure perimeter includes the authentication means for generating and authenticating authenticatable messages, and generates the authenticatable redemption request message representing the outcome data in response to a prize redemption request.

The invention also contemplates an embodiment where the associated memory is loaded with at least one puzzle game, and where the game authorization data comprises an activation message broadcast via mass communication channels. This game authorization data enables the puzzle game to be started after at least one of a certain temporal threshold and an external occurrence. Thus, many players can play a race of skill simultaneously with the first player to complete the game being declared the winner. The authenticatable redemption request message represents a player's solution to the puzzle, and the player's solution and time of completion are verified at said central management computer.

The game computer may generate a hash value of a player's solution to the puzzle game, where a hash value representing a correct puzzle solution for said puzzle is compared to said player's solution at the central management computer.

The game computer may also include provisions for digitally time stamping the hash value, where the means for time stamping are disposed within a tamper-resistant secure perimeter to preclude fraud.

The present invention also provides a method for enabling off-line games of skill for prizes on at least one remote game computer, where the player's game input does not produce a game outcome until the game input is processed by a central management computer, comprising the steps of:

(a) the central management computer forming an authenticatable game authorization message for enabling play of at least one game of skill on the game computer;

(b) at least one of communicating the authenticatable game authorization message and inputting the authenticatable game authorization message to the game computer through at least one of a direct electronic connection and a manually input data step;

(c) generating at least one game of skill on the game computer while the game computer is not connected to any other device during play;

(d) communicating player game input data to the central management computer through at least one of a direct electronic connection and a manually input data step;

(e) the central management computer reading the player game input data and executing a program to produce at least one game outcome based upon the player's game input data; and (f) notifying the player of said at least one game outcome.

The present invention also provides a method for enabling play of probalistic games of chance on at least one remote game computer, where each game has a plurality of chances to win that are selectable by the player on the remote game computer, the player selecting at least one of the chances and the player's selection being verifiable by a central authority with an associated central management computer that authorizes game play on the remote game computer, comprising the steps of:

(a) identifying the game computer to the central management computer;

(b) requesting a number of game authorizations from the central management computer;

(c) the central management computer forming an authenticatable game authorization message representing a plurality of chances to win, at least one of which is selectable by the player for subsequent verification by the central management computer;

(d) communicating the authenticatable game authorization message to the game computer after payment authorization for the authorized games by the player; and (e) the game computer authenticating the authenticatable game authorization message and, if authenticated, allowing the game computer to display the plurality of chances to win for selection by the player.

Redemption of winnings associated with this embodiment further comprises the steps of:

(f) identifying the game computer to the central management computer;

(g) the game computer generating an authenticatable redemption request message representing the selection by the player;

(h) communicating the authenticatable redemption request message to the central management computer through at least one of a temporary direct electronic connection and a manually input data step; and (I) the central management computer authenticating the authenticatable redemption request message and verifying the selection by the player represented therein to authorize at least one of a payout of winnings and credit toward additional game authorizations.

These and other features and advantages of the present invention will be better understood with specific reference to the detailed description which follows and the appended drawings.

DETAILED DESCRIPTION OF THE PREFERRED EMBODIMENTS

Figure 1:
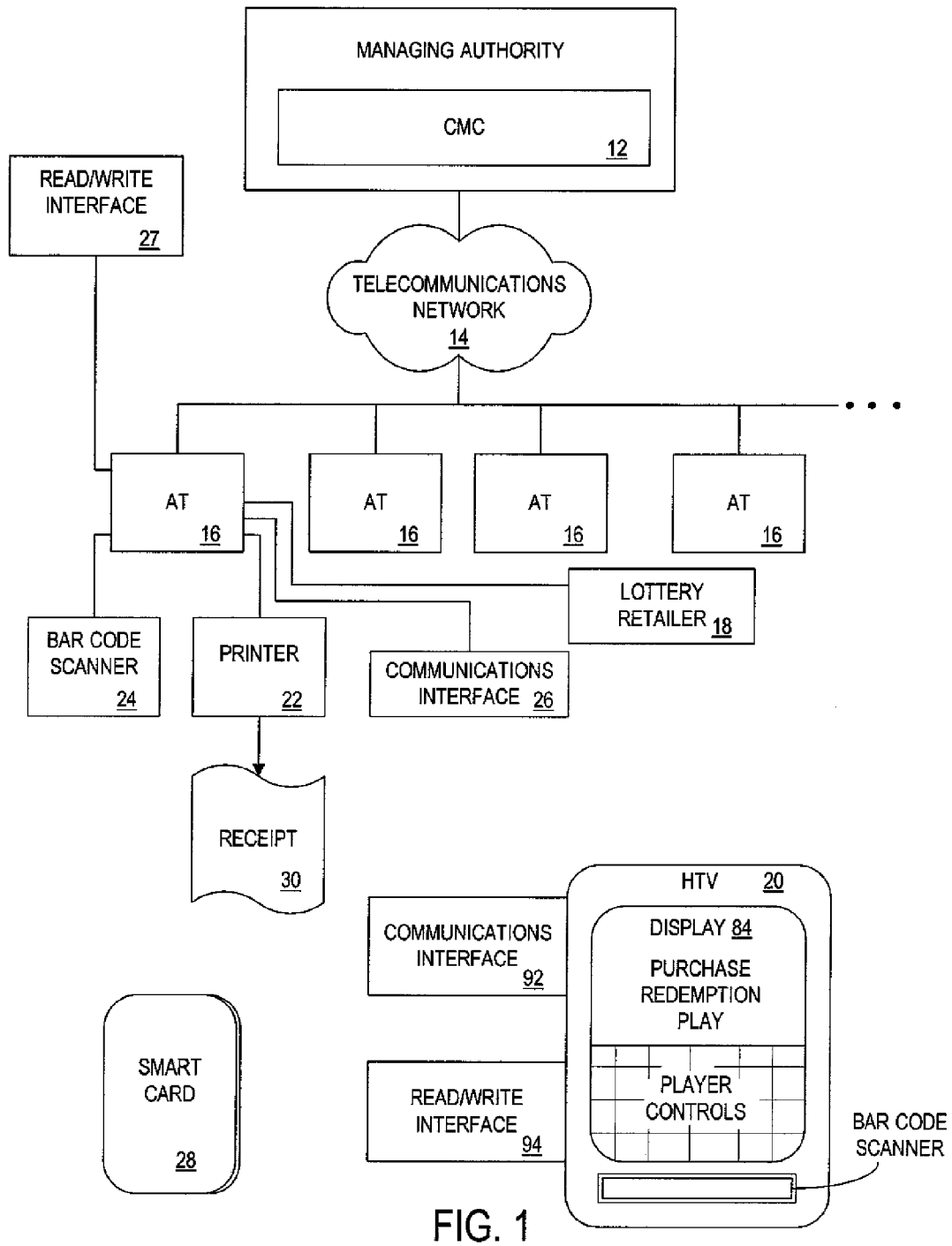
FIG. 1 is a schematic of the remote lottery system showing an CMC, ATs and HTV in a first embodiment.

With reference to the several views of the drawings, there is depicted an off-line system for playing games of skill and games of chance, including lottery games, generally characterized in a first embodiment by the reference numeral 10, and principally comprised of a managing authority 11 having a central management computer CMC 12, a telecommunications network 14 which provides remote terminal access to the CMC 12, a plurality of agent terminals (AT) 16 associated with various retailers 18, and a plurality of HTV units 20 which enable game play. The term "managing authority" is used in the general sense and is intended to include any central authority, including any agents thereof which oversees and administers tournaments of skill and/or any wagering authority which sells no choice (e.g., scratch-off lottery tickets, bingo or a sweepstakes) or pseudo-choice (e.g., video poker) games or races of skill having a known correct solution if the player plays correctly. The term "retailers" includes any participating merchant where an AT 16 is located. As described in the foregoing, a "ticket" as used herein means a single net outcome or payoff. This outcome may constitute an aggregation of outcomes; the important aspect being that the CMC 12 has a record of the outcomes sold in any purchase transaction for future verification of prizes/winnings, just as with the current practice of selling instant-type lottery tickets. Thus, the player is essentially purchasing outcomes/game authorizations from the CMC 12. These are transferred to the HTV 20 and may be revealed through various games generated thereon. The word "game" as used herein is intended to include the graphic rendition of, for example, an instant scratch-off type lottery ticket on the display screen of the HTV 20 or any other device having an electronic display.

In one exemplary embodiment, the player goes to a retailer 11 for purchase and redemption. As will be explained in more detail below, however, it is anticipated that the CMC 12 and AT 16 may be combined into a single unit or even into a system which enables outcomes/game authorizations to be purchased over the telephone or any interactive communications network. Alternatively, outcomes/game authorizations could be purchased through RF communications between a transceiver associated with the CMC 12 and a transceiver associated with the HTV 20. These embodiments are described further below.

FIG. 1 is a schematic block diagram depicting an overview of the system components in the first embodiment. The CMC 12, telecommunications network 14 and ATs 16 are connected in similar fashion as those in the prior art used to dispense instant paper tickets. With respect to the present invention, each AT 16 may include a printer 22, bar code scanner or other scanning device 24, a communications interface 26 for physically coupling the HTV 20 to the AT 16 to electrically communicate data to and from the HTV 20 through a compatible communications interface 154 in the HTV 20, and/or a read/write interface 27 for reading and writing data to data memory media such as a smart card 28. These are used to transfer outcomes/game authorizations to the HTV 20 in the form of an authenticatable game authorization message AGAM and will be described in more detail below. The smart card 28 may also be used to update game programs in the HTV 20 to enable the generation of new games as desired. This capability allows new games to be inexpensively tested for market acceptance by players. The smart card 28 may also be used to transfer advertising information in connection with lotteries in general.

Figure 2:
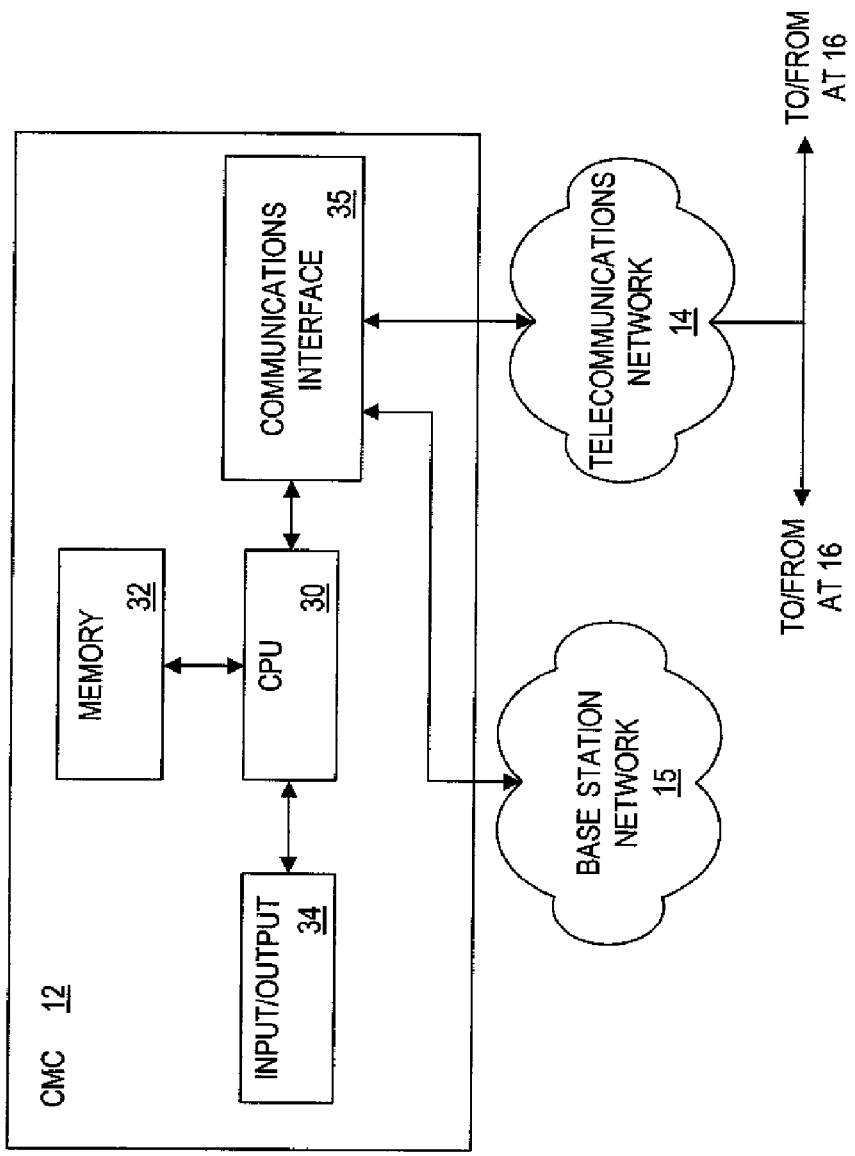
FIG. 2 is a block diagram of the CMC.
Figure 3:
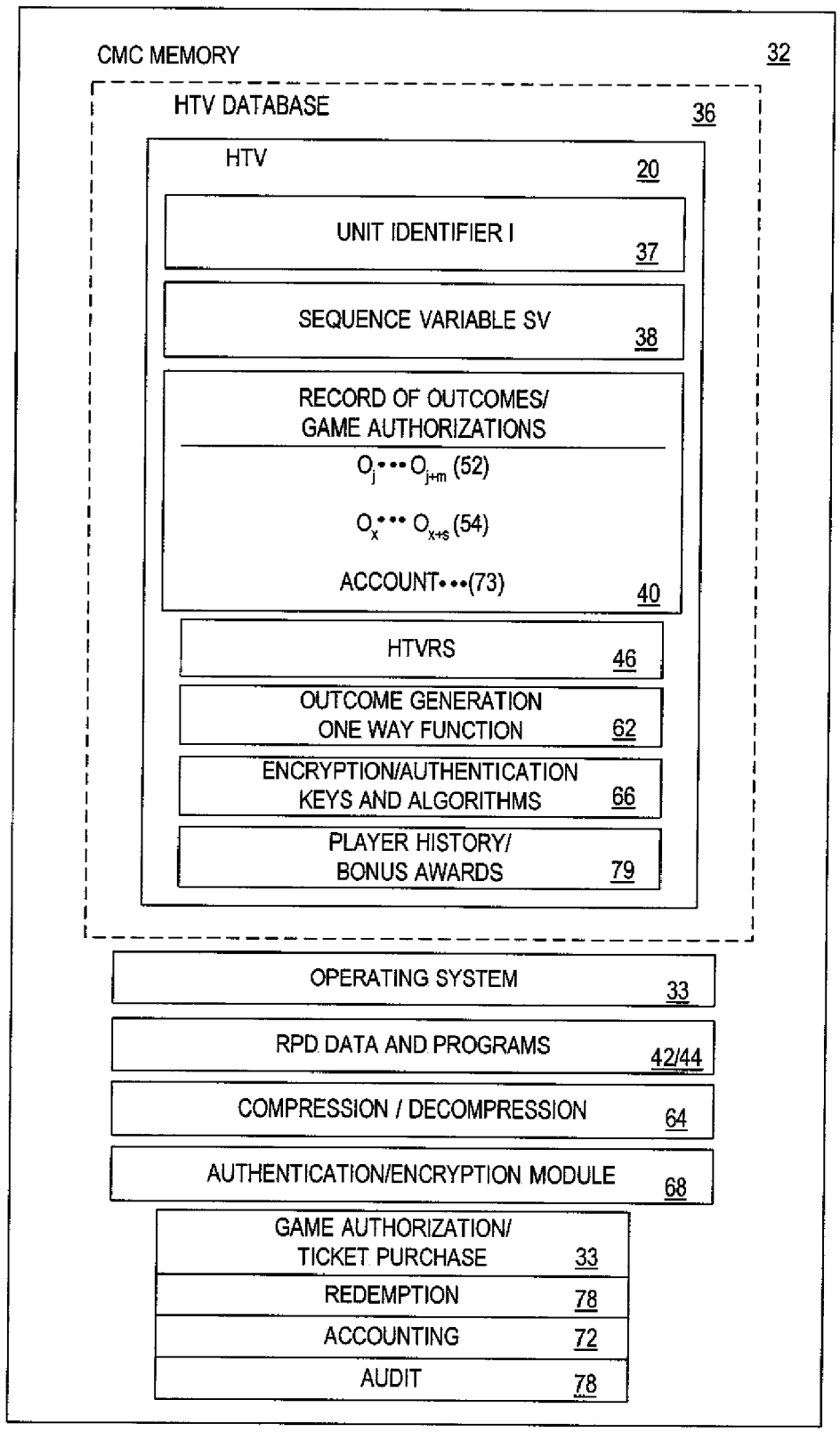
FIG. 3 is a diagram of an exemplary memory arrangement in the CMC.

FIG. 2 is a block diagram showing details of the CMC 12, which generally includes a CPU 30, memory 32, an I/O interface 34 for loading programs into memory 32, and a communications interface 35 for communicating through the network 14 with the ATs 16. The CMC 12 may also communicate through a base station network 15 with a plurality of base stations having transceivers for broadcasting and receiving RF signals to communicate messages directly between the CMC 12 and the HTV 20 in an alternative embodiment described below and illustrated in FIG. 13. The CMC has software or firmware (hereinafter referred to as "programs or routines" and "data") which are used to implement various functions in the system. FIG. 3 depicts an exemplary memory arrangement of programs and data stored in the CMC 12. Memory 32 includes an operating system 33 which controls the CMC 12 in a conventional manner and need not be described in detail. In the illustrative embodiment, the CMC 12 has a memory area or database 36 in memory 32 for each HTV 20 in which specific information is stored to enable the CMC 12 to assign outcomes/game authorizations to that HTV 20 and to keep track of what has been assigned to that HTV 20 to provide for the redemption of winnings and to ensure that the HTV 20 is a verified unit in connection with a given transaction. Data in memory 36 may be retrieved and updated as required in order to perform the desired functions. For purposes of convenience, the following description is directed to an HTV which is registered to a single player. However, it is anticipated that an HTV 20 may contain multiple accounts for different players where access to the HTV 20 is made available through different passwords. An HTV 20 must be initially registered with the managing authority 11 prior to use. In this connection, identification information is initially stored in memory 32 of the CMC 12. The identification information includes a unique unit identifier or HTV ID ("ID") stored in a field 37 and, optionally, a chaining or sequence variable ("SV") stored in a field 38. The SV may constitute a 64-bit identifier which is unique to each HTV 20. Similarly, the SV may constitute a 64-bit representation of the history of outcomes/game authorizations which have been purchased and transferred to the particular HTV 20. Accordingly, SV is updated in accordance with some predetermined protocol, such as for example, every time purchased outcomes/game authorizations are assigned to the particular HTV 20 as a one-way function of the outcomes/game authorizations purchased. Thus, the SV is unique to each HTV 20 because it is a record of all transactions at any point in time with respect to that HTV 20. In an exemplary embodiment, the SV is used as a way to prevent fraud by uniquely identifying the particular HTV 20 as a function of both I and SV during purchase and/or redemption transactions. The particular protocols are discussed in more detail below.

In this regard, a current record of outcomes/game authorizations for given purchases to a specified HTV 20 may be stored in field 40 in the HTV database 36 in CMC memory 32 as an audit trail. Thus, the CMC 12 can subsequently compare alleged or claimed outcomes/game authorizations to the ones stored in the memory of the CMC 12 (which are updated each time outcomes/game authorizations are sold to the HTV 20) in connection with the last transaction. This is one way in which the CMC 12 can verify the identity of the HTV 20.

The present invention employs various cryptographic protocols to prevent fraud, specifically to preclude players from cheating the system by making up prize redemption codes. In this regard, purchased outcomes/authorized games may be represented by an authenticatable game authorization message AGAM and prize redemption requests by an authenticatable redemption request message ARRM by using a variety of protocols, including: one-way hash functions (also known as compression functions, contraction functions, message digests, fingerprints, cryptographic checksums, data integrity checks (DICs), manipulation detection codes (MDCs), and data authentication codes (DACs)), one-way hash functions with encryption keys (also known as message authentication codes (MACs)), digital signatures, and the like, with an encryption/decryption module in the HTV 20 as described further below. The practice of using cryptographic protocols to ensure the integrity and security of messages is well known in the art and need not be described here in detail. For reference, one of ordinary skill in the art may refer to BRUCE SCHNEIER, APPLIED CRYPTOGRAPHY, PROTOCOLS, ALGORITHMS, AND SOURCE CODE IN C, (2nd Ed, John Wiley & Sons, Inc., 1996). The encryption/decryption module contains algorithms and keys for encrypting, decrypting and/or authenticating messages. Examples of well-known cryptographic authentication protocols with regard to a prize redemption request where the CMC 12 verifies the claimed winnings are as follows:

Encryption:

Setup: CMC 12 and HTV 20 share a secret key.

1. HTV 20 encrypts outcome/game authorization data with the shared secret key to form an authenticatable redemption request message ARRM.

2. Communicate authenticatable redemption request message ARRM to CMC 12.

3. CMC 12 reads and decrypts the authenticatable redemption request message ARRM with the same key.

4. If the message is intelligible, then the CMC 12 accepts the redemption request as authentic.

*Encryption may be implemented with an algorithm such as DES (U.S. Government standard, specified in FIPS PUB 46). Encryption may utilize any of several algorithms known in the art such as IDEA, Blowfish, RC4, RC2, SAFER, etc. See APPLIED CRYPTOGRAPHY.

Message Authentication Code:

Setup: CMC 12 and HTV 20 share a secret key.

1. HTV 20 hashes outcome/game authorization data with a MAC and the shared secret key to form an authenticatable redemption request message ARRM.

2. Communicate authenticatable redemption request message ARRM to CMC 12.

3. CMC 12 reads the ARRM and hashes the message with the shared secret key.

4. If the generated hash matches the received hash, the CMC 12 accepts the redemption request as authentic.

*Any of the MAC algorithms, such as, for example, DES, CBC and the like may be applied in this application.

Encryption with a Public Key

Setup: HTV 20 has a public-key/private key pair. The CMC 12 knows the HTV 20's public key.

1. HTV 20 encrypts outcome/game authorization data with the private key to form an authenticatable redemption request message ARRM.

2. Communicate authenticatable redemption request message ARRM to CMC 12.

3. CMC 12 decrypts the ARRM with the public key of the HTV 20.

4. If the message is intelligible, the CMC 12 accepts the redemption request as authentic. A sample algorithm for this procedure is RSA.

Signing with a Public Key

Setup: HTV 20 has a public-key/private key pair. The CMC 12 knows the HTV 20's public key.

1. The HTV 20 signs the outcome/game authorization data with the private key to form an authenticatable redemption request message ARRM.

2. Communicate authenticatable redemption request message ARRM to CMC 12.

3. CMC 12 verifies the signature using the message and the public key. The mathematics of verification indicates whether the outcome message is authentic.

4. If the outcome message is intelligible, then the CMC 12 accepts the outcome message as authentic.

There are several ways to ensure that an authenticatable redemption request message ARRM is "fresh" (i.e., it has not been used more than once). In the first, known as "challenge/reply", the CMC 12 generates a random or sequence number (also referred to as a "nonce") and communicates it to the HTV 20. The HTV 20 then incorporates this random number in the authenticatable redemption request message ARRM. If the random number received matches the random number just generated, the CMC 12 accepts the message as fresh, i.e., an old message would contain a different random number.

In another method, the HTV 20 includes the sequence number SV in the authenticatable redemption request message ARRM. The SV is then incremented by one every time the HTV 20 generates an authenticatable redemption request message ARRM. The CMC 12 stores the most recent sequence number in memory, It accepts the current outcome message if the sequence number received is one greater than the stored sequence number.

In yet another implementation, the HTV 20 includes the current time in the authenticatable redemption request message ARRM. The CMC 12 then checks the time associated with the authenticatable redemption request message ARRM against the time from the CMC's associated clock. If the times are within a prescribed window, the current outcome message is accepted as fresh.

In still another application, the HTV 20 includes a random number in the authenticatable redemption request message ARRM. The CMC 12 maintains a database of all random numbers received from the HTVs 12. If the new random number is not in that database, then the current authenticatable outcome message is accepted as fresh. If a time element is incorporated as well, then the CMC 12 only has to store a relatively small quantity of unexpired messages.

Turning now to the outcomes/game authorizations that are actually communicated to the HTV 20, they are predetermined in the sense that the CMC 12 knows exactly what has been transferred to a given HTV 20 in connection with any purchase. In order to facilitate outcome generation, the CMC 12 may include a program 42 for generating a random prize data stream ("RPD") 44; a pool containing a finite series of win/lose outcomes/game authorizations $O_1 \ldots O_n$ (e.g., . . . win $2, win $2, lose, lose, win $10, lose, lose . . . . etc). In the case of lotteries, the aggregate of all winning outcomes/game authorizations in any RPD 44 is a predetermined percentage payout of the total revenues to be generated by the sale of all "tickets" represented by the outcomes/game authorizations in the RPD 44. However, the outcomes may be generated "on the fly" (i.e., contemporaneous with or simultaneous to a purchase request). In the illustrative situation where the RPD is determined in advance, when a purchase request is received, the CMC 12 utilizes a "ticket" (outcome) purchase routine 48 that randomly selects the next m outcomes/game authorizations from the RPD 44 (and possibly "standby outcomes/game authorizations"-x to allow for reinvestment of winnings, this will be described below) to be assigned to a particular HTV 20. The outcome purchase routine 48 then directs the CMC 12 to generate an authenticatable game authorization message AGAM which is subsequently communicated to and read by the HTV 20 following one of the protocols described below. For auditing purposes, the outcome purchase routine 48 may also direct the CMC 12 to store transactional data in a record 40, including the outcomes/game authorizations m assigned in field 52, and the standby outcomes/game authorizations x assigned in field 54, and optionally, even the AGAM itself. Accompanying this data may be the price point for a given "ticket" (outcome) such as $0.25, $1, $2, etc., in field 56, the net payoff in field 58, and the time/date in field 60. Thus, a record is generated in the CMC 12 for each transaction with a given HTV 20.

In one embodiment, each HTV 20 may be assigned a unique reference string ("HTVRS") which is stored in field 46. An identical HTVRS is stored in the particular HTV 20 as described below. The HTVRS is a random series of win/lose outcomes/game authorizations. When a purchase is made, the outcome purchase routine 48 directs the CMC 12 to find the same outcomes/game authorizations or a series of outcomes/game authorizations having the same net payoff in the HTVRS. These outcomes/game authorizations or the net payoff may be represented by one or more memory addresses in the HTVRS. The outcome purchase routine directs the CMC 12 to generate an authenticatable game authorization message AGAM which represents that address or addresses in the HTVRS. The HTV 20 can interpret the AGAM to find the same outcomes/game authorizations or a series of outcomes/game authorizations with the same net payoff in its very own HTVRS. This will be explained in more detail below.

Another way in which the CMC 12 can assign outcomes/game authorizations is through the use of a one-way function which utilizes a seed value to generate a sequence of outcomes/game, authorizations that are selected from the RPD 44. The HTV memory area 36 in the CMC memory 32 includes such a one-way function in field 62. An identical one-way function is stored in the HTV 20 as described below. The seed value for this one-way function becomes part of an authenticatable game authorization message AGAM.

In the situation where codes are input manually into the HTV 20 and/or the AT 16 to facilitate game authorization purchase and subsequent prize redemption, the CMC 12 can compress the data representing the outcome sequence into a "smaller code" which is thereafter decompressed in the recipient device. Specifically, the CMC 12 may be configured with a compression/decompression routine 64 that takes a series of m outcomes/game authorizations $O_j \ldots O_{j+m}$ which are selected by the outcome purchase routine 48, and compresses that sequence into a smaller variable which is then concatenated into the authenticatable game authorization message AGAM. As part of the compression process, the outcomes/game authorizations $O_j \ldots O_{j+m}$ may be rearranged into any hierarchal order, i.e., number of losers, number of $1 winners, number of $2 winners, etc) if desired. This type of compression is useful in embodiments where the authenticatable game authorization message AGAM is printed on a receipt or rendered in the form of a bar code, to allow for manual data entry into the HTV 20 or by scanning the AGAM as described below. Compression is also useful in the telephone embodiment shown in FIG. 12 and described below where the player may communicate messages over the telephone in response to suitable prompts. It may likewise facilitate any of the other methods of transferring outcomes/game authorizations, such as for example, where the HTVRS address is transferred.

In another approach, the outcome purchase routine 48 can calculate the expected net payoff of the m outcomes/game authorizations $O_j \ldots O_{j+m}$ and accordingly generate an authenticatable game authorization message AGAM which represents that net payoff. In response to this data, the HTV 20 can then randomly generate games which yield outcomes/game authorizations having that net payoff. This method is not suitable for standby outcomes/game authorizations.

In order to provide for added security in the system, the authenticatable game authorization message AGAM may be encrypted for secrecy using any of the protocols described above. What this means that the message is first made authenticatable and thereafter encrypted, for example, by using a private/public key pair. This prevents anyone without knowledge of the proper keys from decrypting the message and interpreting its contents. In one example, encryption/authentication keys that are known only to the CMC 12 and the target HTV 20 are stored in field 66. An authentication/encryption module or routine 68 provides for implementing the cryptographic protocols when communicating these messages to and from the CMC 12. Game authorization messages generated by the CMC 12 may be made authenticatable by, for example, using the following protocol. In response to a purchase request for a number of authorized games $T_0$ comprising outcomes $O_j \ldots O_{j+m}$, the CMC 12 obtains the target HTV 20's authentication key K_A and forms $T=MAC\{K\_A\} (T_0, CM)$ where CM is a challenge message generated by the target HTV 20 and $(T_0, CM)$ represents $_0T$ concatenated with CM. Authentication and encryption data/keys may be stored in field 70.

Other programs resident in the CMC memory 32 include an accounting routine 72 which calculates and updates the winnings for each HTV 20 in an account 73 associated with memory area 40. The term "winnings" as utilized herein is intended to include money, reward points or some other reward indicator. The accounting routine 72 is used to track the cumulative value of player winnings and losses after the player has cashed-out. The accounting routine 78 enables the CMC 12 to duplicate a player's credit balance at any point in the outcome sequence.

The CMC memory 32 further contains an audit routine 78 which is used to manage and update records of all transactions with the HTVs 20 identified in the HTV database 36, using the transaction specific data discussed above.

The CMC memory 32 also includes a redemption routine 78 which directs the CMC to verify asserted winnings to enable a player to cash-out. The redemption routine 78 can cash-out any winnings in a player's current credit balance, either by generating new game authorizations or by authorizing some kind of payoff. The redemption routine 78 directs the CMC 12 to read a authenticatable redemption request message ARRM generated by the HTV 20 in connection with a prize redemption request. The redemption routine 78 can also determine the number of standby outcomes/game authorizations which were actually played and those that remain outstanding at the time the redemption request is made. All of this will be explained in more detail below.

In order to provide for tracking player history, data relating to players, including any related bonus award data, may be stored in a player information database 79. In this manner, the managing authority 11 can provide, players with loyalty rewards such as free outcomes/game authorizations for total "tickets" purchased or the like.

Figure 4:
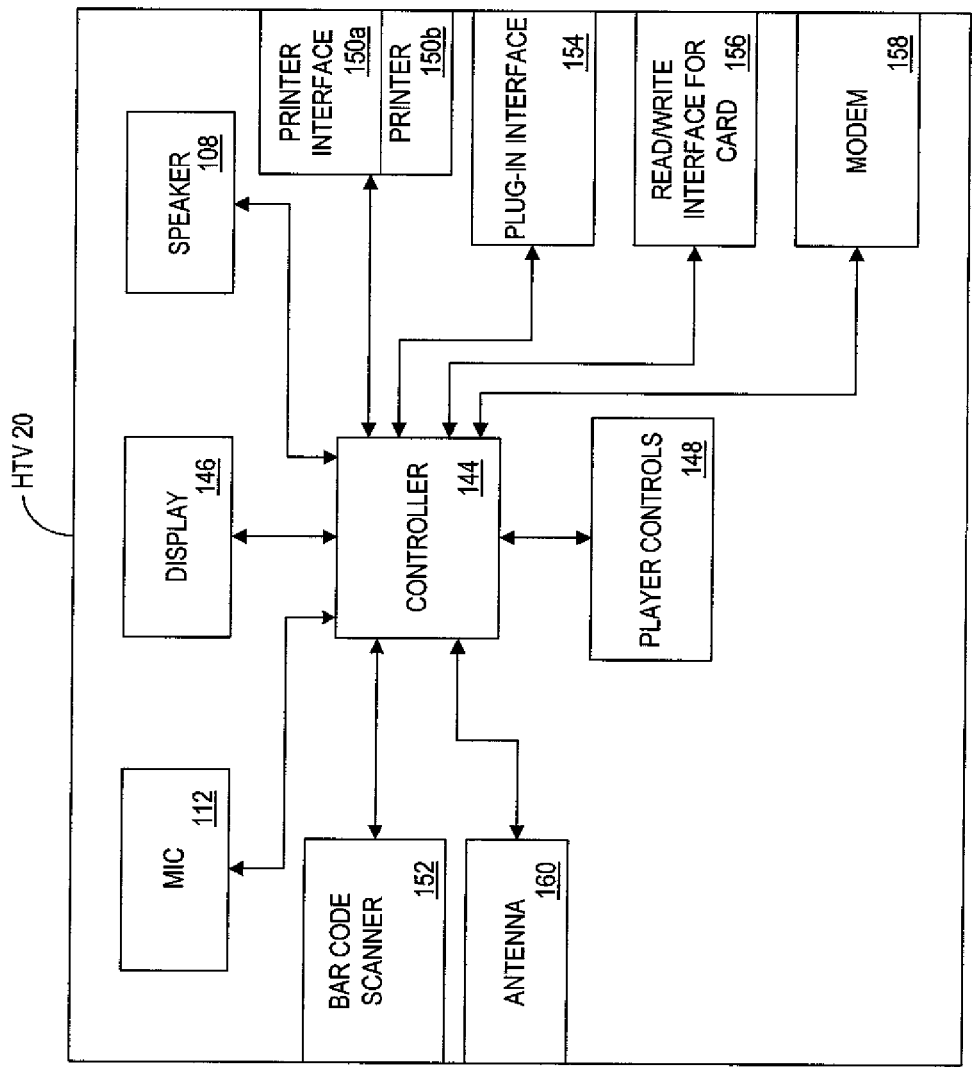
FIG. 4 is a block diagram of the components in an HTV.
Figure 5:
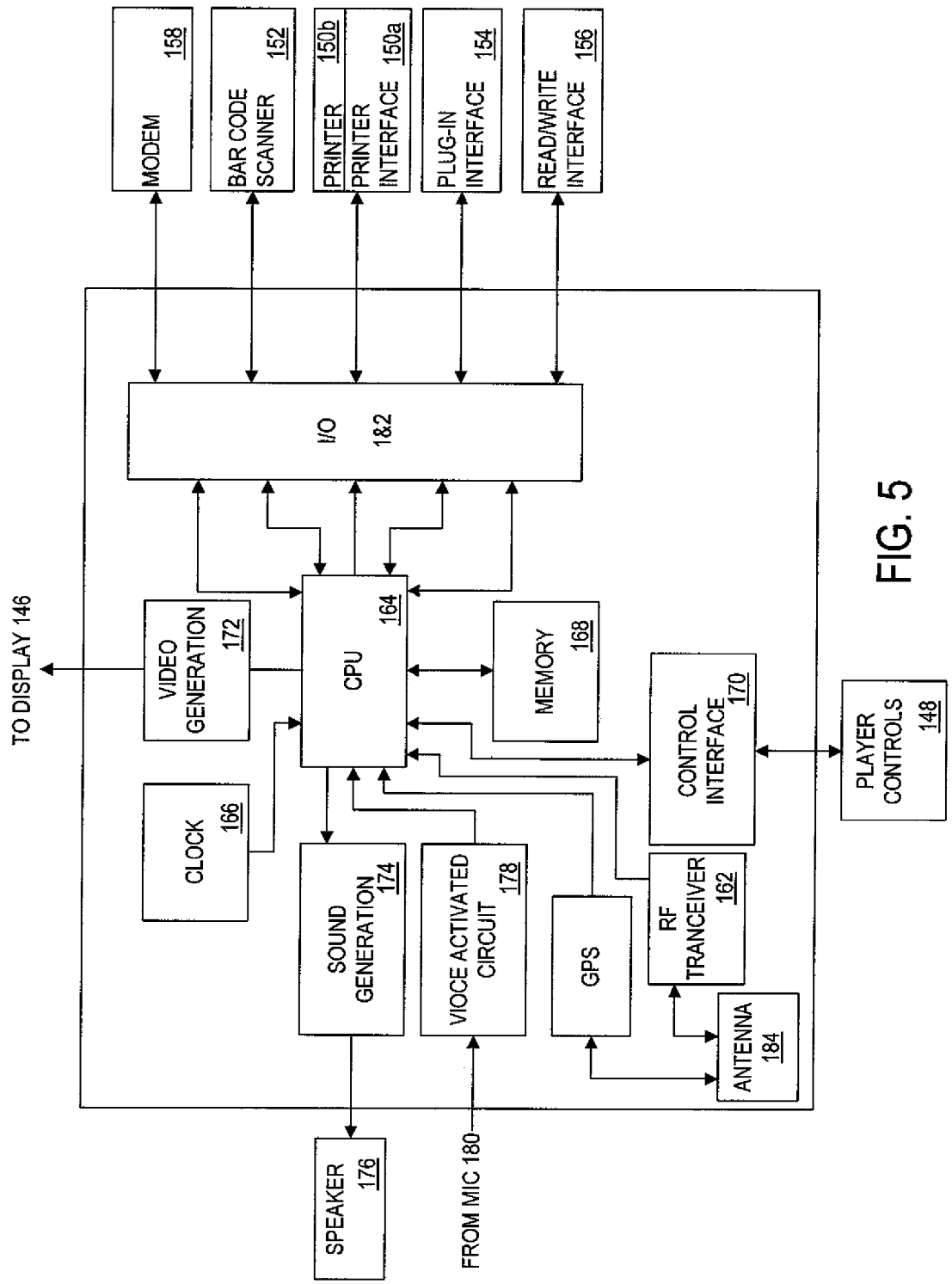
FIG. 5 is a block diagram of the controller in the HTV.

Referring now to FIGS. 4 and 5, the HTV 20 in a preferred embodiment is a hand-held unit having a controller 82, a display 84, and player controls 86. Preferably the HTV 20 includes one or more of the following: a printer interface 88a for connecting the HTV 20 to an external printer, an internal printer 88b, a bar code scanner 90, a communications interface 92 compatible for connecting the HTV 20 to the communications interface 26 associated with an AT 16 to enable the HTV 20 to electrically communicate directly with the AT 16, a read/write interface 94 for reading data from and writing data to smart card 28, a modem 96 for connecting the HTV 20 directly to a telecommunications network 14 coupled to the CMC 12 in an alternative embodiment shown in FIG. 12 and described below, and an antenna 115 coupled to a transceiver 113 for broadcasting and receiving messages to and from a base station 600 associated with CMC 12 in another alternative embodiment shown in FIG. 13 and described below.

The player controls 86 may be integrated into display 84 in a touch-screen arrangement of the type known in the art. The display 84 may also include the capability to render messages in a bar code readable format to enable them to be scanned by the bar code scanner 24 coupled to the AT 16. The player controls 86 allow the player to select various game, outcome transfer, and redemption functions. The controller 82 includes a CPU 98, a clock 101 and memory 102 comprised of ROM and RAM in a conventional arrangement. The controller 82 may be optionally housed in a tamper-evident or tamper resistant and/or evident enclosure to reveal to the managing authority 11 any suspected tampering with the device. For enhanced security, the encryption/decryption module that implements the portions of the cryptographic protocols at HTV 20, is disposed within such a secure perimeter.

A secure perimeter is a defined physical area of hardware which is tamper-resistant and/or temper-evident, in which resides data or algorithms whose characteristics must not be alterable in order for a system to remain secure. Examples of secure perimeters include U.S. military encryption devices such as the STU-III telephone made by Motorola and AT&T, and the iPower® card, available from National Semiconductor Corp. As shown schematically in the block diagram of FIG. 5B, the latter is a dedicated encryption/decryption device embodied in a PCMCIA card 300 which can interface with the HTV 20 through, for example a PCMCIA socket or other compatible interface. The card includes a 32-bit CPU 302 with ROM 304 containing encryption algorithms, a real-time clock 36' and an interface with an off-chip battery (310)—backed RAM 308 which holds encryption data and key information. Any attempt to tamper with or get at the encryption data stored within the device results in a memory loss of that data. Moreover, the I/O pins 312 of the device are electrically isolated to prevent pin-level probes, and the chip itself contains mechanical and chemical protection to prevent chip-probing equipment from accessing the encryption information from the processor directly. If such a secure perimeter 300 is employed, all encryption/decryption functions are performed in the secure perimeter 300 and not in the CPU 98 of the HTV 20. Control of the secure perimeter 300 by the HTV 20 and communications between the CPU 302 of the secure perimeter 300 and the CPU 27 of the HTV 20 are known in the art and need not be described here in detail. When the secure perimeter 302 is called upon by the HTV 20 to generate an authenticatable message, authenticate an authenticatable message, and/or perform any other required functions, the controller 82 of the HTV 20 sends the appropriate signals to the CPU 302 of the secure perimeter 300. If desired, the secure perimeter 300 may be used to subsequently authenticate the authenticatable messages that it generates, as well as authenticatable messages from any other HTV 20 in the system. It may also be used to time-stamp messages or track times to completion for races of skill with the clock 306.

External secure devices such as the aforementioned iPower cards are also known as "tokens." A token is a physical computing device used by individuals to gain access to protected electronic resources. Intelligent security tokens may be utilized to prevent unauthorized players from using that HTV 20, as well as for implementing the encryption/decryption functions for outcome authentication and certification. The iPower card described above, is an example of a token in a secure perimeter.

Other such tokens include the SMARTDISK, manufactured by SmartDisk Security Corporation. The SMARTDISK contains a CPU and memory used for encrypting and decrypting data. Thus, as with the iPower card, the encryption/decryption module may reside in the SMARTDISK. The SMARTDISK requires a user password to function. Thus, access to the system requires the player to physically possess the token and know the proper password. Smart cards are similar tokens. They are shaped like credit-cards, but contain an embedded microprocessor for implementing various security functions.

Another type of token called TOUCH MEMORY is manufactured by Dallas Semiconductor Corporation. This device consists of a computer chip housed within a small button shaped stainless steel case. The case may be ring-shaped and worn around a player's finger. The chip contains up to 64 kb of RAM or EPROM, sufficient to store a plurality of cryptographic keys. The device transmits data bidirectionally at 16.3 kb per second when placed into contact with a reader device. Each chip contains a unique serial number that is laser-etched into the chip at the time of manufacture. Keys from the device may be used in any of the cryptographic protocols described herein for authentication and/or encryption, as well as for user identification. The DS1422 UNIQUEWARE product can be configured to transparently decrement each time that the device is used, allowing players to obtain and store a limited number of start messages, for example. The DS1427 configuration includes a tamper-resistant real-time clock 306 that may be utilized in the different applications described herein.

The HTV's CPU 98 communicates with the player controls 86 through a control interface 103, and with video generation hardware/drivers 104 for controlling the display 84, and sound generation hardware/drivers 106 coupled to a speaker 108 for communicating game sounds in accordance with well-known principles.

To enable data to be communicated to and from the HTV 20, several embodiments are contemplated, including voice transfer, manual input, scanning, RF communications and the like. A voice activated circuit 110 of the type known in the art may be coupled to a microphone 112 to enable messages to be communicated to the CPU 98 by spoken commands. The CPU 98 communicates with the printer interface 88*a* or the internal printer 88*b*, bar code scanner 90, interface 92, read/write interface 94; and modem 96 through conventional I/O interfaces shown generally in the block diagram at 114. The CPU 98 may communicate with RF circuitry 113 coupled to an antenna 115 for communicating messages directly with the CMC 12 via the base station as shown in the alternative embodiment in FIG. 11. In another application, the HTV 20 may have a GPS receiver 111 coupled to antenna 115 which communicates temporal and positional information to the CPU 98. In this manner the HTV 20 can be prevented from operating unless it is located in a certain venue where gaming is permitted by a position enabling/disabling routine in memory.

The authenticatable game authorization message AGAM may be communicated to the HTV 20 using the following protocols. In a first embodiment, the AT 16 prints the authenticatable game authorization message AGAM on a receipt 30 and the agent provides the AGAM to the player. The player simply enters the authenticatable game authorization message AGAM into the HTV 20 using the player controls 86. Alternatively, the AT 16 may print the authenticatable game authorization message AGAM in a bar code readable format to enable the bar code scanner 24 to simply scan the same. In either case, the receipt can be printed without ink using a carbonless two-part form which the player tears off to prevent anyone else from viewing the authenticatable game authorization message AGAM and then trying to input it to another HTV 20. In an alternative embodiment, the HTV 20 can connect to the AT 16 at interface 92 and the authenticatable game authorization message AGAM may be communicated directly to the HTV 20. In another embodiment, the authenticatable game authorization message AGAM may be written to memory in the smart card 28 through the read/write interface 27 connected to the AT 16. The player then plugs the smart card 28 into the HTV 20 and the AGAM may be read by the HTV 20 from the smart card 28. In a further embodiment, the authenticatable game authorization message AGAM may be spoken into the microphone 112, either by the player, the agent or by an automated voice over the telephone in a telephone embodiment shown in FIG. 12, and processed through the associated voice activated circuit 110. In another telephone embodiment, the HTV 20 may be connected to the telephone network 514 directly and the authenticatable game authorization message AGAM may be communicated to the HTV 20 through the modem 96. In the embodiment shown in FIG. 13, the authenticatable game authorization message AGAM may be communicated from the CMC 12 through an RF transmission from either the AT 16 or the CMC 12. Redemption request messages ARRM from the HTV 20 to enable players to cash-out winnings may be similarly communicated.

Figure 6:
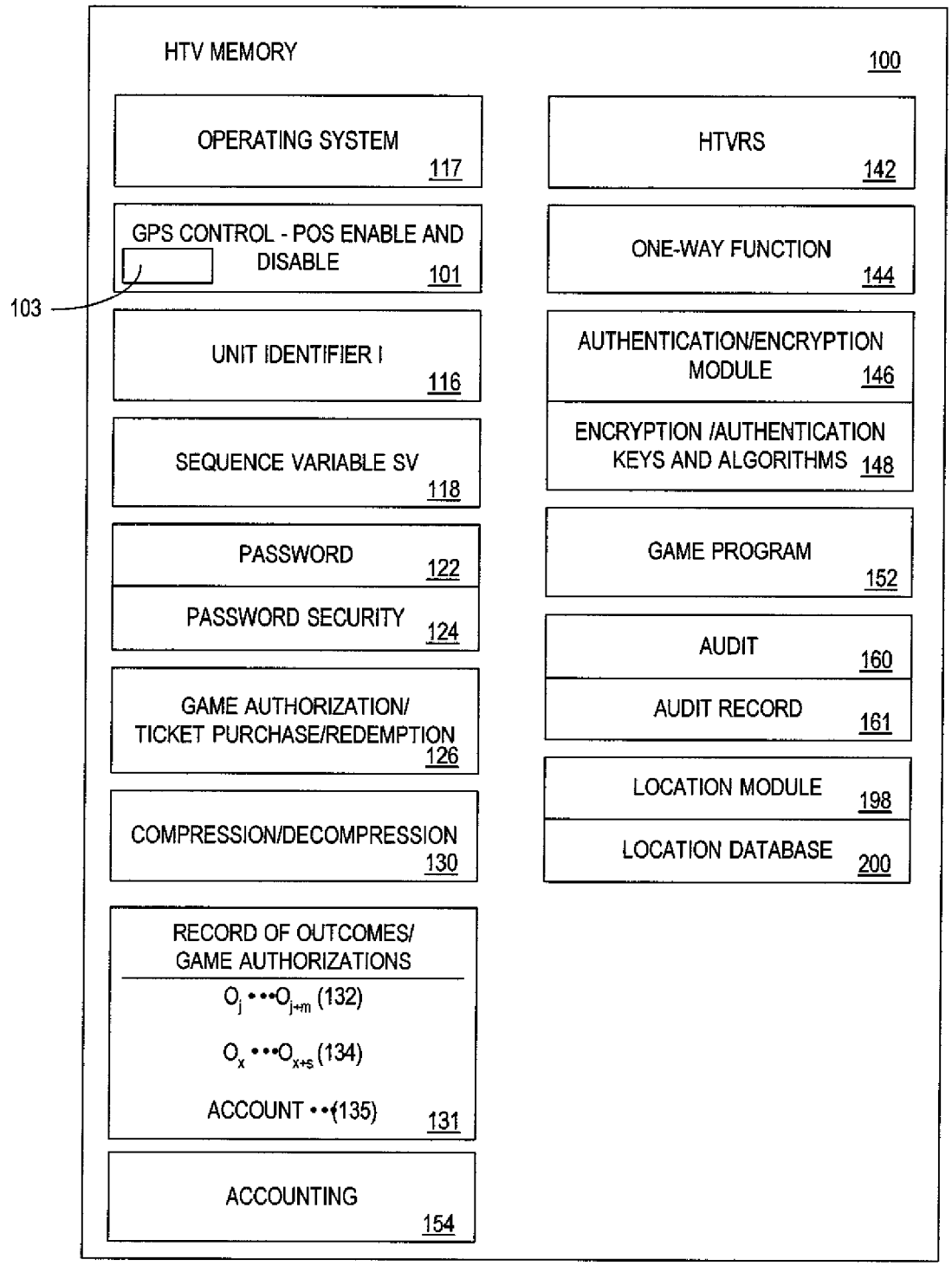
FIG. 6 is a diagram of an exemplary memory arrangement in the HTV.

Referring now to FIG. 6, there is depicted an exemplary memory arrangement 100 of programs and data in the HTV 20. Memory 100 includes an operating system generally indicated by the reference numeral 117 which controls the HTV 20 in a conventional manner. With respect to the present invention, the other programs and data in memory 100 enable the HTV 20 to read messages/data from the CMC 12 and to process these messages in order to generate games which yield the outcomes/game authorizations. The HTV memory 100 may also include a GPS derived position enable/disable routine 101 which disables the HTV 20 when position information from the GPS receiver 111 indicates that the HTV 20 is located in a venue where gaming is impermissible. Information on gambling venues for use by the position enable/disable routine may be stored in field 103. As described above with respect to the CMC memory 32, each HTV stores a unit identifier I in field 116 and, optionally a sequence variable SV in field 118. A password (or multiple passwords for multiple players on a single HTV 20) is stored in field 122. When a player activates the HTV 20, a password security routine 124 checks the player's password in a conventional manner before allowing the player to continue. The HTV memory 100 further includes an outcome purchase/game authorization routine 126 that directs the HTV 20 to generate information to be communicated to the CMC 12 for purchase requests, and to read the outcomes/game authorizations represented in the authenticatable game authorization message AGAM. To facilitate manual entry of data, the authenticatable game authorization message AGAM may be compressed by the CMC 12, and after entered into the target HTV 20, a compression/decompression routine 130 is called by the outcome purchase routine 126 to decompress the authenticatable game authorization message AGAM into usable outcome data (i.e., an outcome sequence). A record of the transaction 131, including the m outcomes/game authorizations, $O_j \ldots O_{j+m}$ represented by the AGAM are stored in field 132. If there are x standby outcomes/game authorizations $O_s \ldots O_{s+x}$ assigned, these are stored in field 134. Accompanying this data may be the price point for each outcome, the net payoff, and the time/date of entry. Account data based upon the foregoing is continually updated by an accounting routine 154 and stored in field 135. The accounting routine 154 directs the HTV 20 to calculate the running cash balance. If there are several players assigned to a given HTV 20, there may be individual accounts for each player.

As described above with respect to the CMC 12, the authenticatable game authorization message AGAM may represent one or more memory addresses in a reference string HTVRS. Accordingly, each HTV 20 may store an HTVRS in field 142. In such an embodiment, the outcome purchase routine 126 directs the HTV 20 to find the sequence of outcomes/game authorizations $O_j \ldots O_{j+m}$ or the net payoff on that sequence in the HTVRS.

Alternatively, the authenticatable game authorization message AGAM may represent a seed value for a one-way function in field 144. In such an implementation, the outcome purchase routine 126 directs the HTV 20 to generate corresponding outcomes/game authorizations $O_j \ldots O_{j+m}$ using the one-way function. The same one-way function is stored in the CMC memory 32 as discussed above, to enable the CMC 12 to verify the data pursuant to a prize redemption request.

As described above, by making the game authorization messages authenticatable, they are precluded from being used, either inadvertently or fraudulently, in the wrong HTV 20. An authentication/encryption module 146 operating in accordance with the above, provides for the authentication/encryption/decryption of messages communicated to and from the HTV 20. Encryption/authentication keys and algorithms reside in field 148. As described above with respect to the CMC memory 32, the sequence variable SV, which is unique to each HTV 20, may be used as a key or otherwise incorporated in the messages.

The HTV 20 includes a game generation routine ("game program") 152 which provides for the generation of various games in accordance with the purchased outcome data and win/lose scoring on the display 84. The game generation program may also include a tutorial for teaching players how to play the games and a help function for each game. The games can be generated with win or lose outcomes that identically correspond to each outcome $O_j \ldots O_{j+m}$ represented by the authenticatable game authorization message AGAM. In this regard, the game merely interprets or reveals the outcome. Alternatively, the games may be generated where an m number of games have a net payoff equal to the net payoff in the series $O_j \ldots O_{j+m}$. The latter, however, is not suitable for embodiments where standby outcomes/game authorizations are assigned as described below. A single game may have multiple chances but only one outcome.

The game generation program 152 may be designed to generate a variety of games of types well known in the art. Accordingly, the specifics of presenting electronic games on a game computer need not be discussed in detail. It is contemplated that many kinds of games can be rendered, including games of skill; "no-choice" or non-skill games with a predetermined outcome such as, for example, the type commonly associated with pull-tab type instant lottery tickets, slot machine type games where the outcome appears random to the player but is known to the CMC 12 prior to, or becomes known to the CMC 12 at the time of, game purchase a sweepstakes, or bingo; or pseudo-choice games with a predetermined outcome such as video poker. In the case of the latter, the outcome for a particular poker game is predetermined with a maximum payoff which is recovered if the player plays every hand correctly. If the player plays incorrectly, the payout is less than the maximum represented by the outcome for a particular game. In addition, the game program 152 may generate games that are races of skill. These include crossword puzzles or word descrambler games which must be completed within a specified period of time. If the player completes the game in the time allotted, the player is paid the predetermined payoff on the outcome purchased for that game. If not, a win is not credited to the HTV account 155 described below. The game program 152 can be designed to require a game identifier such that the managing authority 11 selects the particular games to be played in connection with any outcomes/game authorizations that are sold. In this regard, the authenticatable game authorization message AGAM may include data that the game program 152 uses to direct the HTV 20 to generate a specific game for those outcomes/game authorizations. In order to provide for updating games in the HTV 20, new game programs can be loaded into memory 100 in a conventional manner via the smart card 28 or by plugging the HTV 20 into the AT 16 as described above and then uploading the appropriate software instructions/data.

The HTV memory further includes a redemption routine 158 that is used to cash-out the player's current credit balance in the player's account 155. The redemption routine 156 has an associated cash-out function. When selected, it directs the HTV 20 to generate an authenticatable redemption request message ARRM, which is subsequently communicated to the CMC 12 using any of the above-described methods for communicating authenticatable game authorization messages AGAMs to the HTV 20, only in reverse. Authenticatable redemption request messages ARRMs are interpreted by the redemption routine 78 in the CMC 12 to verify cash-out requests by comparing known target HTV identification data and outcome data (net winnings, the number of games played) for a particular unit. The authenticatable redemption request message ARRM may be generated on the display 84 of the HTV 20 and orally provided to the agent at a retailer 18 for manual entry into the AT 16. Alternatively, the authenticatable redemption request message ARRM can be printed onto a receipt 30, either by an internal or external printer 88*b* associated with the HTV 20, or by a printer 22 at the lottery retailer via the printer interface 88*a*. Such a receipt 30 is then provided to the agent. In this connection, the authenticatable redemption request message ARRM may be rendered on the display 84 or on the receipt 30 in a bar code readable format and scanned by the bar code scanner 24 at the AT 16. In another embodiment, the authenticatable redemption request message ARRM may be written to the smart card 28 and then read therefrom by the AT 16. In yet another embodiment, the authenticatable redemption request message ARRM can be communicated to the CMC 12 over the telephone network 14 via the modem 96. In still another embodiment, the authenticatable redemption request message ARRM may be communicated from the HTV 20 to the CMC 12 through an RF transmission to either the AT 16 or the CMC 12.

The HTV memory 100 also includes an audit routine 160 which stores a record of all activity performed on the HTV 20 in field 161 to assist in protecting data integrity and to verify that the various programs in memory 100 have not been tampered with. The audit routine 100 further provides a record of player activity for the player and the managing authority 11 in the event of any dispute.

Figure 7:
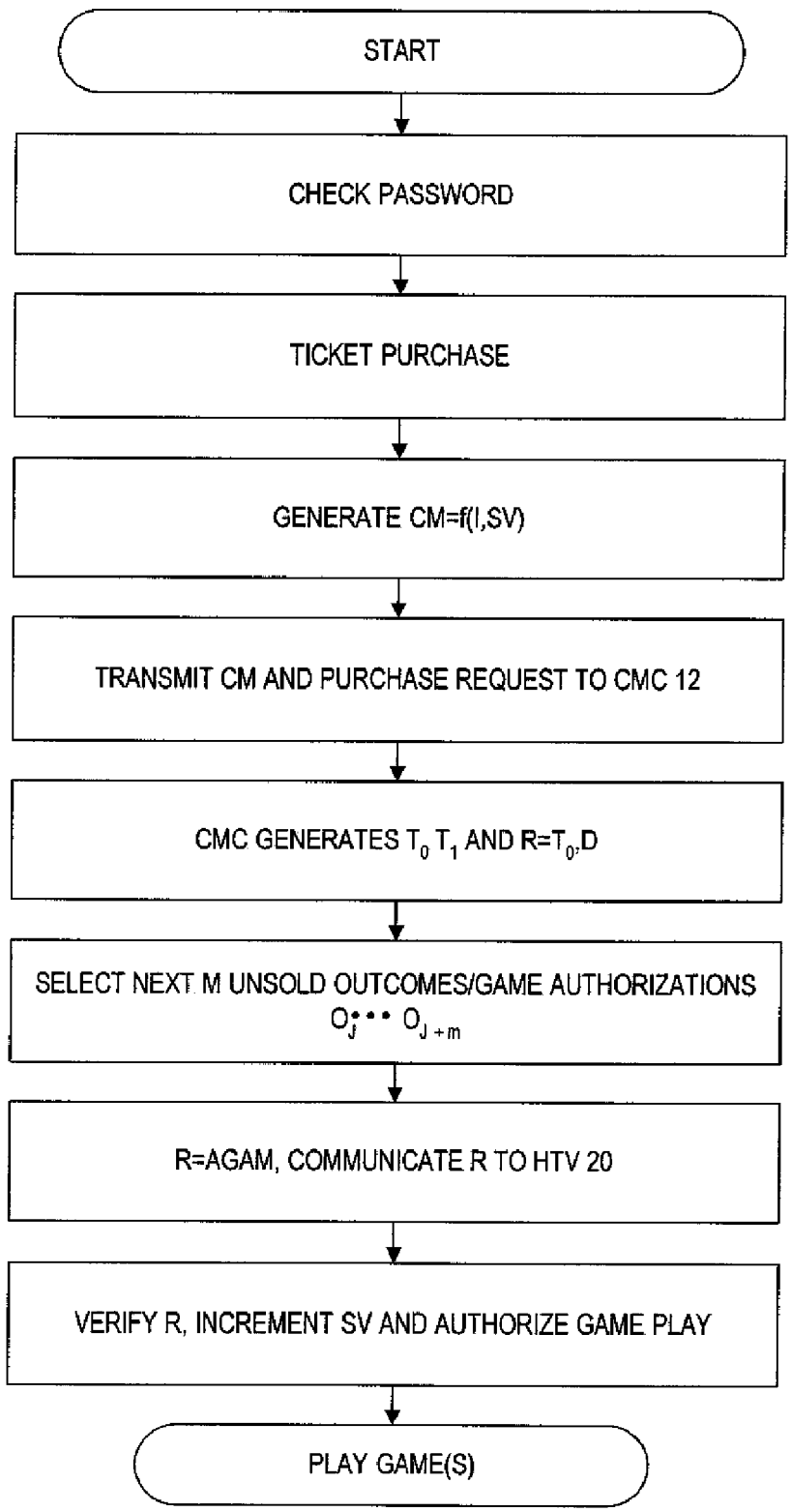
FIG. 7 is a flow chart of an exemplary outcome/game authorization purchase.

Referring now to FIG. 7, there is shown a flow-chart of an exemplary outcome purchase of m "tickets" (outcomes/game authorizations) from the CMC 12 through an AT 16 at a lottery retailer 11. For convenience, the following assumes all outcomes/game authorizations are purchased at a single price point. However, the outcomes/game authorizations may represent different price points that are embodied in a separate authenticatable game authorization message AGAM for each price point, or collectively in a single authenticatable game authorization message AGAM.

To start the purchase sequence, the player first activates the HTV 20 and enters his or her password which is checked by the password security routine 124. The player then selects the purchase "ticket" function. The outcome purchase/game authorization routine 126 directs the HTV 20 to generate a challenge message CM as one-way function of I and SV (CM=f(I, SV)) where the I is concatenated with SV. The CM is communicated to the CMC 12 via any of the above-described methods. At the same time, the player arranges for payment of some kind, confirmation of which by the CMC 12 allows the procedure to continue.

The CMC 12 then runs the outcome purchase/game authorization routine 48 and, in a sample protocol, obtains the target HTV 20's authentication key K_A and forms $T_I$=MAC{K_A} ($T_0$, CM) where CM is a challenge message generated by the target HTV 20 and ($T_0$, CM) represents $T_0$ concatenated with CM. It then generates a string of digits R=($T_1$, D), where D is a string of decimal digits and ($T_1$, D) represents$_1$ T concatenated with D. R represents an authenticatable game authorization message AGAM in the format of a compressed code which may be manually entered into the HTV 20 by the player. In this regard, one starts with D, an empty string of decimal digits, and B, a large binary number. Next, read out T in hexadecimal, discard any hex digits from a to f, and copy all decimal digits into D. Then form T=hash (T), and repeat the procedure until D has all the decimal digits it requires. The outcome purchase routine 48 in CMC memory 32 randomly selects the next m unsold outcomes/game authorizations $O_j \ldots O_{j+m}$ for a particular price point from the RPD 44 in connection with a given purchase. It also directs the CMC 12 to store the outcomes/game authorizations $O_j \ldots O_{j+m}$ in field 52, the price point in field 56, the net-payoff and the time/date.

The string R=AGAM is communicated to the HTV 20, and verified by the HTV 20 using cryptographic protocols. If verified, then SV is incremented and the number of outcomes/game authorizations represented by $T_1$ is updated and ready for plays.

The CMC 12 stores the authenticatable game authorization message AGAM for the given purchase in the record 40, updates SV as a one-way function of the authenticatable game authorization message AGAM, and stores the new value for SV in field 38.

In a scenario where the player goes to an agent terminal AT 16, the CMC 12 transmits the authenticatable game authorization message AGAM to the AT 16 in a manner similar to the way in which typical lottery tickets are purchased as is well known. The AT 16 can print a receipt 30 containing the AGAM, date, time, price point and m (the # of purchased outcomes/game authorizations) at step 332. The agent gives the receipt 30 containing the authenticatable game authorization message AGAM to the player after the player pays the agent in accord with conventional practice. At this point, an outcome purchase confirmation message is communicated from the AT 16 to the CMC 12 which serves as confirmation that the player has "irrevocably" purchased the outcomes/game authorizations represented by the authenticatable game authorization message AGAM.

The HTV 20 can verity the contents of the authenticatable game authorization message AGAM by cryptographic protocols. In one example, the AGAM is authenticated using SV as a key and again using I as a key. It can then store the authenticatable game authorization message AGAM in the record 131 for future audits. If data representing the outcomes/game authorizations are compresses by the CMC 12, the decompression/compression routine 130 is enabled to decompress the sequence and store the same in field 132. The outcome purchase routine 130 may also store the price point and net payoff. If the authenticatable game authorization message AGAM represents an address in the HTVRS, the outcome purchase routine 130 will search the HTVRS stored in field 142 for that address or an address where a series of outcomes/game authorizations reside with the same net payoff as $O_j \ldots O_{j+m}$. If the authenticatable game authorization message AGAM represents a seed value for a one-way function stored in field 144, the outcome purchase routine 130 will use the seed value to generate the same series of outcomes/game authorizations $O_j \ldots O_{j+m}$. Alternatively, the authenticatable game authorization message AGAM may simply represent the net-payoff on a number of m outcomes/game authorizations $O_j \ldots O_{j+m}$, in which case the game program 152 generates a number of games with the same net payoff. At the end of the procedure, both the HTV 20 and the CMC 12 have new values for SV stored in their respective memory areas. The player plays games on the HTV 20 generated by the game program 152 which yield the outcomes/game authorizations $O_j \ldots O_{j+m}$, or the net payoff on those outcomes/game authorizations in a conventional manner. As described above, the player's account balance is updated by the accounting routine 154 as each outcome is revealed.

Figure 8:
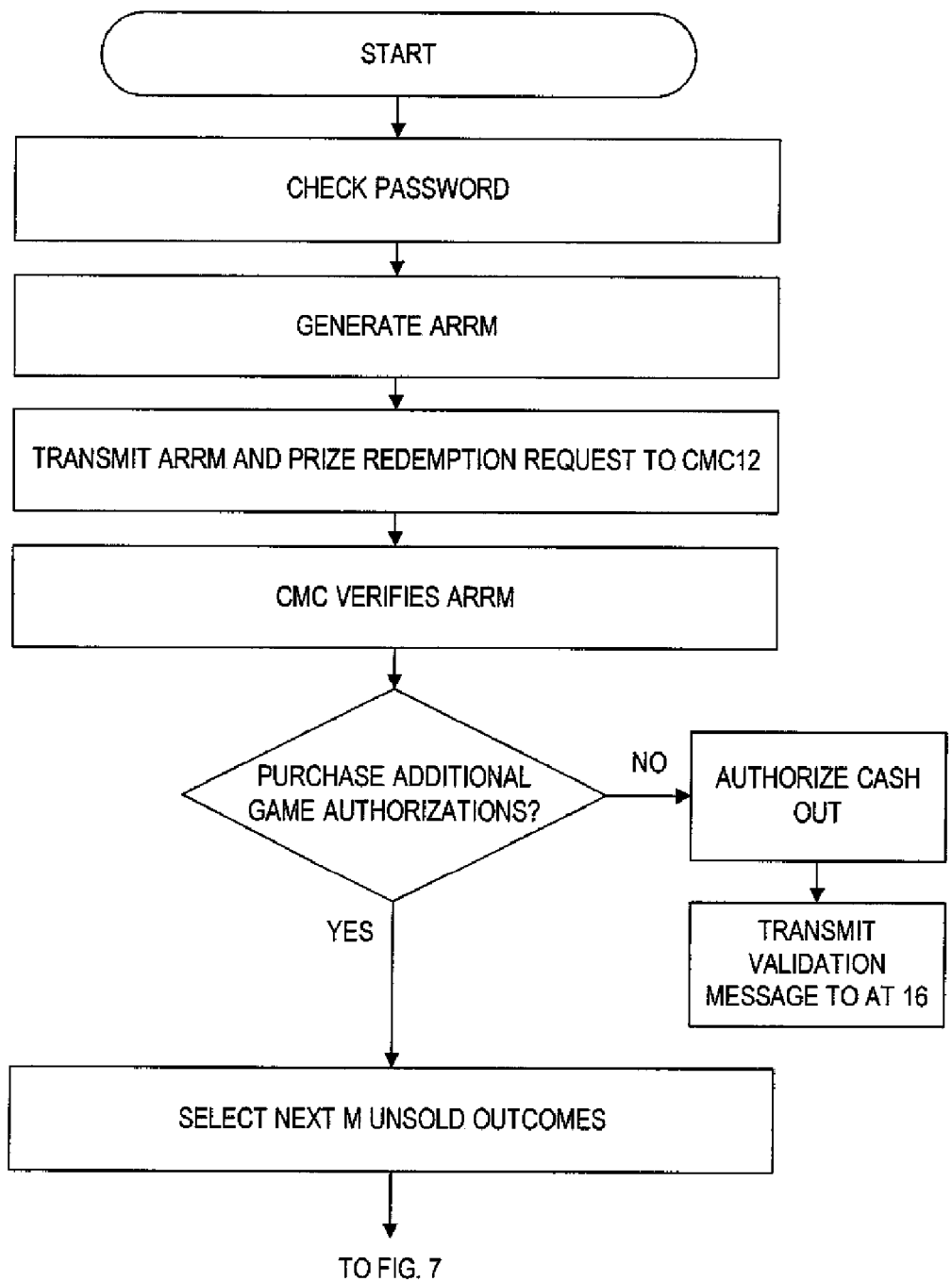
FIG. 8 is a flow chart of an exemplary prize redemption sequence.

Referring now to FIG. 8, there is shown an exemplary prize redemption or cash-out sequence. In the course of the redemption transaction, the HTV 20 identifies itself to the CMC 12, communicates data representing what has transpired on that HTV 20, and if such activity is verified by the CMC 12, it then authorizes the appropriate payoff. To begin the redemption sequence, the player first activates the HTV 20 and again, may be prompted to enter his or her password, which is checked by the password security routine 124 as described above. The player then chooses a cash-out function. The redemption routine 158 in HTV memory 100 directs the HTV 20 to generate a challenge message CM. As discussed above, CM may comprise (I, SV). This value uniquely identifies the HTV 20 to the CMC 12. The CMC 12 then forms a random challenge $R_0$, which is communicated to the HTV 20. The HTV 20 then generates the authenticatable redemption request message ARRM=$T_0$=MAC{K_A} ($R_0$, Outcome (s), SV). This data represents the outcomes/game authorizations and may be generated as a function of I and, optionally, as a function of both I and SV. The authenticatable redemption request message ARRM is similar to the authenticatable game authorization message AGAM and related protocols described above. It may be converted into a compressed number to enable manual entry into a telephone for communication to the CMC 12 by concatenating $T_0$ and D as discussed in the foregoing. The ARRM may also include an updated cash balance from the account 155, which represents the payoff on the outcomes/game authorizations accumulated as the game(s) were played. The value for SV was updated as a one-way function of the authenticatable game authorization message AGAM as described above, and this value was also updated in the CMC memory 32. The authenticatable redemption request message ARRM is communicated to the CMC 12 using the foregoing protocols. In an exemplary embodiment, the player provides a retailer agent with the redemption request, who thereafter activates a redemption function on the AT 16, and transmits the ARRM to the CMC 12 with a redemption request in a conventional manner. The CMC 12 then runs the redemption routine 78 which verifies the authenticatable redemption request message ARRM using the I and SV values stored in memory 32 in fields 37 and 38, respectively, of the HTV database 36. If the ARRM is not verified, the CMC 12 denies the redemption request. If it is verified, the CMC 12 checks the cash balance represented in the authenticatable redemption request message ARRM, against the predetermined amount associated with the purchase of game authorizations for the target HTV 20. The CMC 12 can then transmit a validation message to the AT 16, and the prize amount is debited in account 73. At this point, the player may opt to purchase more outcomes/game authorizations with the present cash balance, in which case the outcome purchase sequence described above is repeated, or alternatively, the player is paid by the agent or some other form of payment is arranged.

Figure 9:
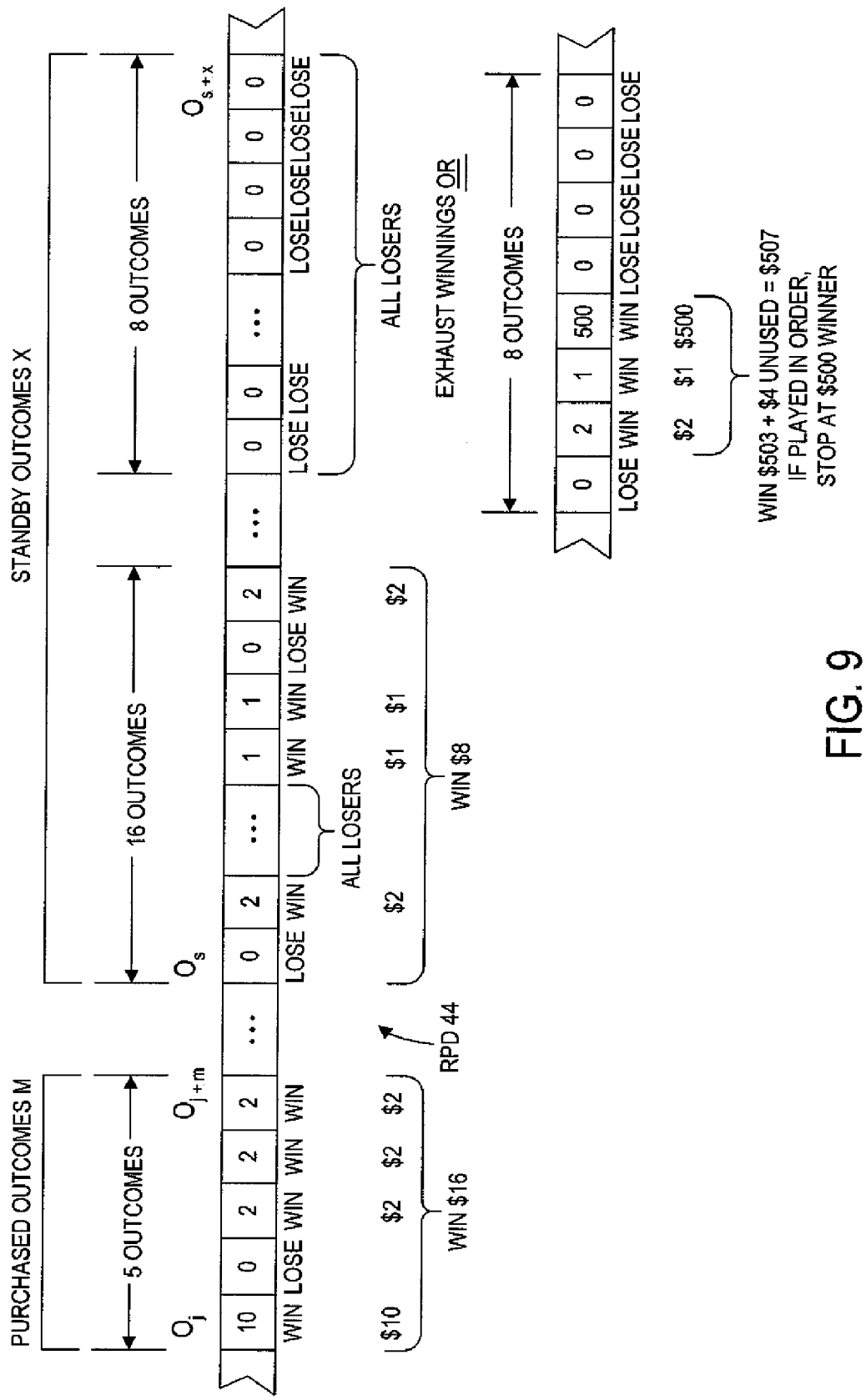
FIG. 9 is a schematic of a random prize data stream showing an example of purchased and standby outcomes.

As described briefly above, an outcome purchase request for m outcomes/game authorizations $O_j \ldots O_{j+m}$ may be accompanied by x standby outcomes/game authorizations $O_s \ldots O_{s+x}$. The standby outcomes/game authorizations are supplied in a number sufficient to exhaust all winnings, or so as to generate a large win at some point in the sequence above a predetermined value where the outcome purchase routine 126 in the HTV 20 will direct the HTV 20 to stop generating games and provide a cash-out instruction on the display 84. Referring now to FIG. 9, there is shown a portion of an RPD 44 with five (5) purchased outcomes/game authorizations $O_j \ldots O_{j+m}$ which have a net-payoff of $16. In this example, the outcome purchase routine 48 in the CMC 12 has selected twenty four (24) standby outcomes/game authorizations $O_s \ldots O_{s+x}$ in two groups as shown. The standby outcomes/game authorizations can be selected from anywhere in the RPD 44 but the groups are played in order. The relative positions between the purchased outcomes/game authorizations m and the standby outcomes/game authorizations x shown in the RPD 44 are merely exemplary. For the purpose of this example, all outcomes/game authorizations are purchased for $1 each. The player wins $16 on the purchased outcomes/game authorizations $O_j \ldots O_{j+m}$. If the player spends that $16 on the first group of sixteen (16) standby outcomes/game authorizations and those outcomes/game authorizations yield a net payoff of $8, the next group may constitute eight (8) outcomes/game authorizations which yield a net payoff of zero (0) in the first example (full exhaustion of winnings) or some large prize (e.g., $500) represented by the fourth outcome in the order shown in the second example for the second group. Referring to the second example, if the outcome sequence in the second group is played in order, and the sequence of outcomes/game authorizations is lose, win $2, win $1, win $500, the player retains $4 in winnings after the first standby group is played and $2+$1+$500 in the second group for a net win of $507. The game program 152 in the HTV 20 will direct the HTV 20 to generate a cash-out message when such a large outcome is revealed. If there are any remaining standby outcomes/game authorizations, in this example four losers, these will be voided in the HTV 20 by the redemption routine 158. Similarly, those four standby outcomes/game authorizations will be voided in the CMC 12 when the CMC 12 receives an authenticatable redemption request message ARRM which represents all outcomes/game authorizations transferred to that HTV 20, including the m purchased outcomes/game authorizations, and the x standby outcomes/game authorizations. Since the player may choose to cash-out at some time during the sequence before all standby outcomes/game authorizations are revealed, the authenticatable redemption request message ARRM generated by the HTV 20 represents which standby outcomes/game authorizations were revealed by the HTV 20 and enables the CMC 12 to compute the proper payoff and to void any unused standby outcomes/game authorizations in the CMC 12.

In a standby outcome embodiment, the outcome purchase routine 48 in the CMC 12 randomly selects m purchased outcomes/game authorizations $O_j \ldots O_{j+m}$ and x standby outcomes/game authorizations $O_s \ldots O_{s+x}$ from the RPD 44 in connection with a purchase request. The CMC 12 then generates an authenticatable game authorization message AGAM, which represents both the m outcomes/game authorizations and x standby outcomes/game authorizations. The HTV 20 then generates games which yield the m outcomes/game authorizations $O_j \ldots O_{j+m}$ or the net payoff on those outcomes/game authorizations. As before, the HTV 20 utilizes the accounting routine to update the cash-balance in account 155. The outcome purchase routine 126 can direct the HTV 20 to display an option to reinvest the current cash-balance (winnings) in account 155. If the player chooses to cash-out, the above-enumerated cash-out sequence may be followed. If the player wants to reinvest some or all of the cash-balance, the game program 152 will then generate a game(s) which yields a standby outcome in $O_s \ldots O_{s+x}$. The accounting routine 154 in the HTV 20 keeps updating the account 135 with a new cash-balance and displays the updated balance to the winner on the display 84, depending upon whether the standby outcome was a winner or loser. The outcome purchase routine 126 then voids the last standby outcome revealed, and updates the status (to "revealed") of that outcome in the sequence of standby outcomes/game authorizations stored in field 54. If the last standby outcome revealed generates a large prize over some predetermined threshold, the outcome purchase routine 48 directs the HTV 20 to display a message to the player that he or she must cash-out. The player then goes through a prize redemption sequence. If not, the outcome purchase routine 48 checks whether there are any unused standby outcomes/game authorizations remaining in field 54. If not, the player has exhausted the cash-balance in account 135 and the HTV 20 generates a zero cash-balance on the display 84. If any standby outcomes/game authorizations remain, the player can choose whether to continue to reinvest. If the player again chooses to reinvest, the HTV 20 will generate another game which yields the next standby outcome (this process may be repeated until exhaustion). If the player elects to cash-out, the HTV 20 indicates the cash-balance in account 155 and the player then proceeds through the prize redemption sequence.

To cash-out in a standby outcome implementation, the redemption routine 126 in HTV memory 100 generates a status record of the standby outcomes/game authorizations and the accompanying cash balance in account 155, incorporates the same into an authenticatable redemption request message ARRM, and voids any unused standby outcomes/game authorizations stored in field 54. After transmitting the ARRM to the CMC 12, it runs the redemption routine 78 to verify the authenticatable redemption request message ARRM and calls the accounting routine 154 to calculate the payoff on the standby outcomes/game authorizations represented in the ARRM. It then credits the HTV account 135, voids any unused standby outcomes/game authorizations, and sends a validation message to the AT 16 to authorize prize redemption.

Figure 10:
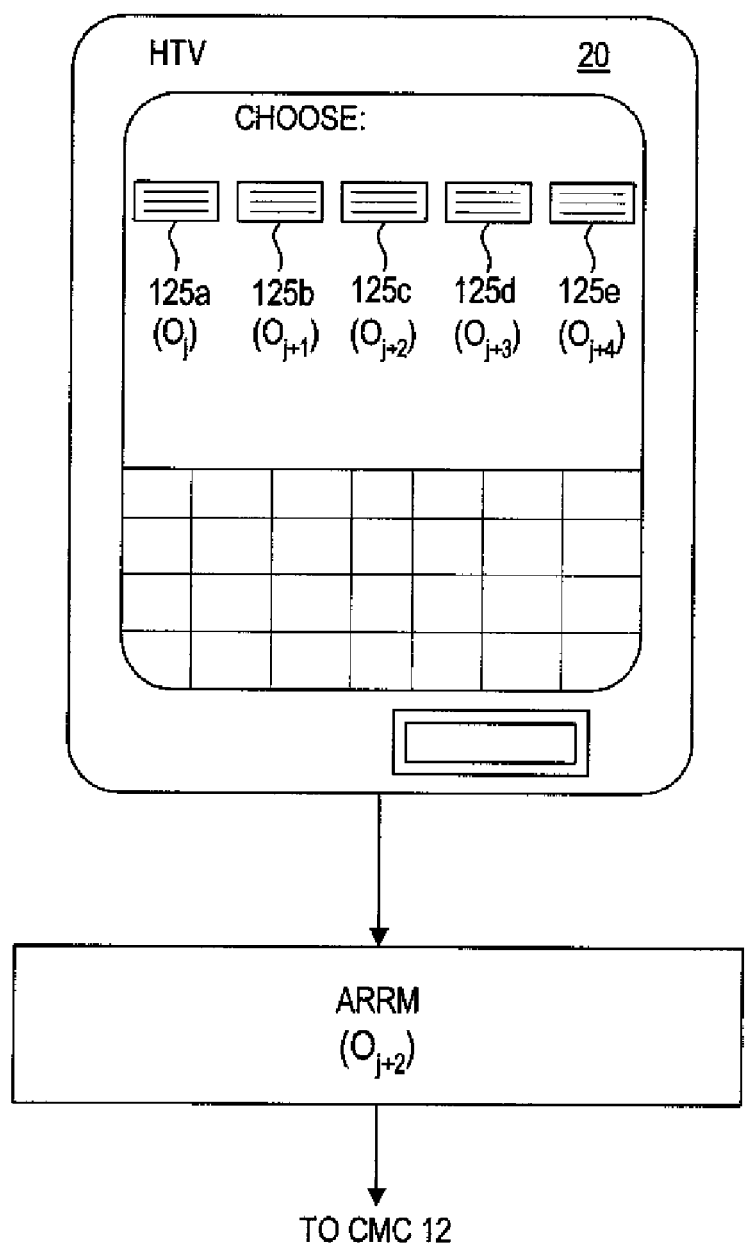
FIG. 10 is a schematic of an embodiment for playing probabilistic games of chance.

Referring now to FIG. 10, there is shown another embodiment of the present invention for playing probabilistic games of chance, in which the authenticatable game authorization message AGAM represents a plurality of player selectable chances to win. Thus, the player's selection determines the outcome of the game. The CMC 12 then verifies the player's selection through the foregoing protocols. In the example shown, the game has five (5) "scratch-off" areas identified by the reference numerals 157a . . . 157e (for the purpose of this example, the outcomes are sequential—$O_j$ . . . $O_{j+5}$). The player can only select one of these areas per game authorization. Assume the sequence represents the following outcomes in the RPD; lose, win $20, lose, win $5, lose, and the player selects area 157c ($O_{j+2}$), corresponding to a win of $20. To effectuate redemption, the HTV 20 generates an authenticatable redemption request message ARRM that represents outcome $O_{j+2}$. To prevent a player from hacking the device in an attempt to ascertain which chance to select, the HTV 20 only contains data identifying outcomes that were assigned from the CMC 12. Thus, reading the data in the HTV 20 is useless, since the player could not interpret the same to find the most favorable outcome. Alternatively, this embodiment can be modified such that the HTV 20 immediately indicates the prize amount, by protecting the integrity of the data. This may be implemented by having the processor components disposed within a tamper-resistant secure perimeter as described above.

Figure 11:
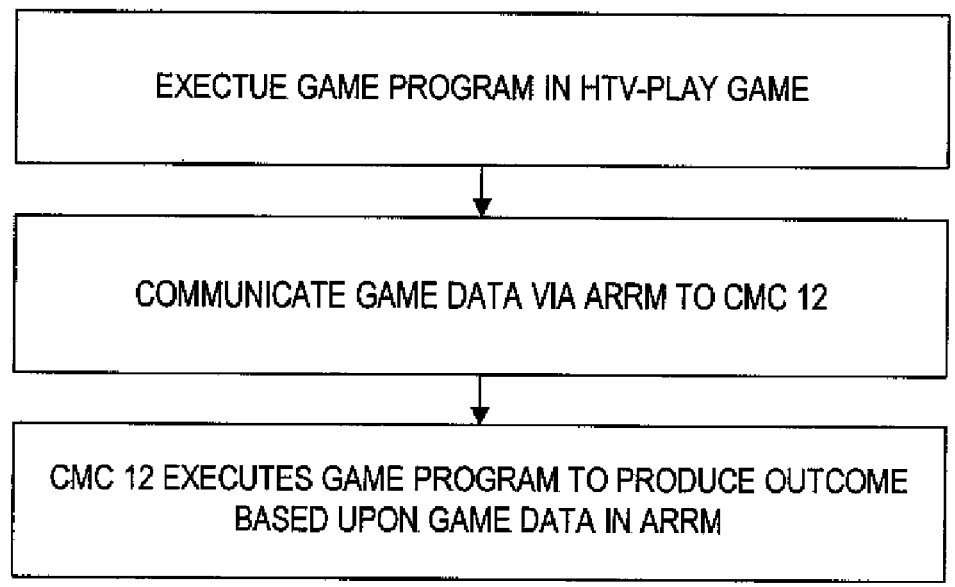
FIG. 11 is a schematic of an embodiment for playing games of skill where the outcomes are not immediately made available to the player but rather are computed by the central management computer.

Referring now to FIG. 11, there is depicted another embodiment of the invention, in which games of skill are played on the HTV 20 with no immediate outcome. The results of the game are generated by the CMC 12 upon receipt of certain game parameter data from the HTV 20. In an illustrative application, the game program 152 directs the HTV 20 to render a golfing game of skill, such as, for example, PGA TOUR 96 available from ELECTRONIC ARTS. In this game, a digital image of a golf game is rendered on the HTV display 84, comprising a golf ball on a tee, fairway, trees, sand traps, etc. A human figure is superimposed on this background, and Swings a golf club in response to player inputs via the input controls 148. The player's club swing data reperesents various parameters, including the club selected (e.g., one iron, two iron, three wood, etc.) and its specific characteristics (e.g., club head orientation), foot placement, and swing force, speed, direction and the like. In the course of a typical computer generated golf game, these parameters are applied to software instructions that compute a trajectory path for the ball to generate a resultant ball location. After the player swings the club, the display may depict the new ball location relative to the hole. The player continues the game in accordance with well known principles until he places the ball in the hole, and a corresponding score is generated. The present invention contemplates such a game of skill where the player's swing produces a given result that is not known by the player until confirmed by the CMC 12. Assume for the purpose of illustration, that the game objective is to attain a hole-in-one. The initial ball position is the same for every swing, and only one swing per game is allowed. Thus, each game/game authorization is contained in the authenticatable game authorization message AGAM as described in the foregoing, and enables a single swing to be made. The game program 152 is executed by the HTV 20 and allows the player to select a club, foot placement, swing power and other swing parameters to "swing" the club in accordance with the above, utilizing the input controls 148. Other factors, including ambient conditions such as wind speed and direction or other random variables, may be introduced for greater realism. In response to the player's swing input, the HTV 20 generates a data message representing all of the above-described swing parameters but the player does not immediately know the result. The HTV 20 or other associated literature instruct the player to contact the central authority as described in the foregoing to find out whether the swing resulted in a "win." The swing data is incorporated into an authenticatable redemption request message ARRM and communicated to the CMC 12 using any of the protocols discussed above (e.g., code input by telephone, direct electronic link, etc.). The CMC 12 then runs a program that takes the player's swing parameters to produce a given result; in this case, either a hole-in-one or a miss. If the player achieved a hole-in-one, then some prize may be authorized. To prevent players from eventually determining the swing parameters that produce a favorable result for a given game, such as the proper club choice and swing force/timing, the game program 152 can render different course configurations. These are selected by the CMC 12 for any given game authorization, and identified by appropriate data in the authenticatable game authorization message AGAM that enables game play on the HTV 20.

Figure 12:
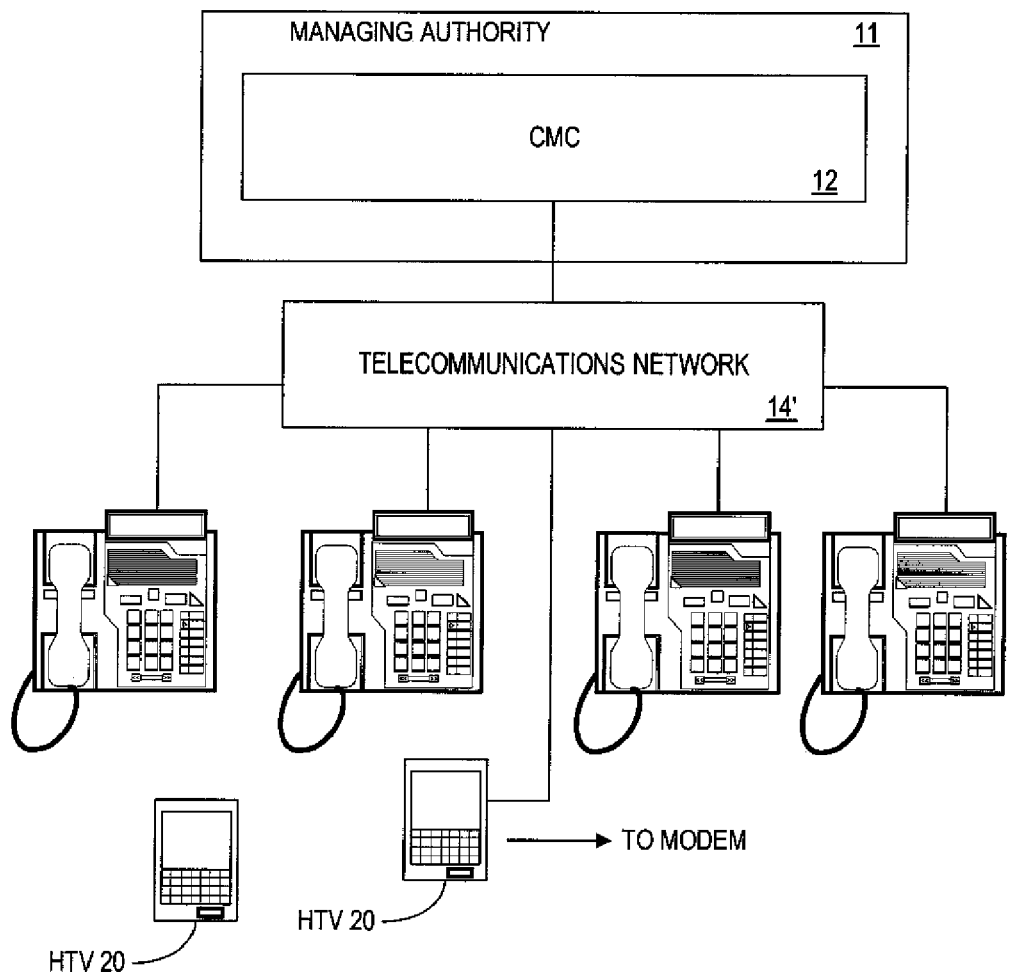
FIG. 12 is a schematic of an alternative embodiment of the invention.

Referring now to FIG. 12, an CMC 12 is coupled to a telecommunications network 14' having interactive voice capability and is accessible by dialing a 900 number or the like to enable the outcome purchase and redemption to be effectuated over the telephone 13. Alternatively, the telecommunications network 14' may be any interactive communications or data network. The protocol is similar to that described above with regard to purchase and redemption at an AT 16, except that here the player simply keys the information into the telephone 13 in response to prompts from the system. Thus, the player first communicates the HTV identification information and requested game authorization data to the CMC 12. If HTV identification/registration is confirmed, the CMC 12 then provides a "ready" indication to the player with instructions to select the number of outcomes game authorizations to be purchased for each price point. The CMC 12 then generates an authenticatable game authorization message AGAM as described above which the player enters into the HTV 20. The system operates similarly to effectuate prize redemption. The HTV 20 generates an authenticatable redemption request message ARRM, and the player simply keys the redemption request message into the telephone in response to the appropriate prompts. The authenticatable redemption request message ARRM is communicated to the CMC 12, which verifies the same, including the expected payoff as discussed above. A credit can then be made to an account for the HTV/player in the CMC 12. In a modification of this embodiment, the HTV 20 may contain its own modem 96 that enables it to communicate directly over the telecommunications network 14. Alternatively, the HTV 20 may incorporate a cellular phone (not shown) or some other communications apparatus for the same purpose. For the purpose of this invention, this embodiment is still considered to be an "off-line arrangement" as there is no need to have an on-line data connection between the HTV 20 and the CMC 12 while game are being played.

Figure 13:
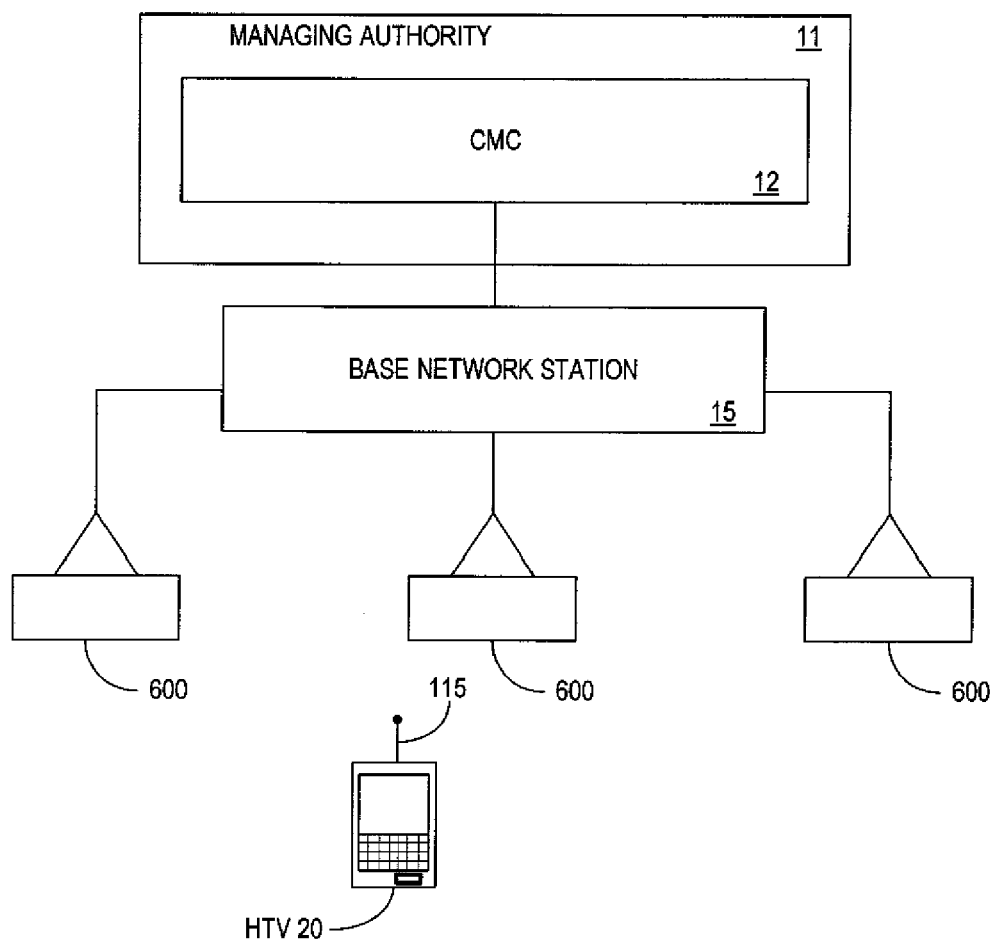
FIG. 13 is a schematic of another alternative embodiment of the invention.

In a further embodiment shown in FIG. 13, the CMC 12 communicates through a base station network 15 with a plurality of base stations 600 for broadcasting and receiving RF messages. To operate in such an environment, the HTV 20 may include a transceiver 113 for broadcasting and receiving RF communications to enable all purchase and redemption functions to be implemented without the need for the player to travel to a retailer. The protocol, however, is similar to the ones described above with respect to the other embodiments, and thus need not be described in detail here.

We claim:

1. A system for enabling games of chance for prizes on at least one remote game computer, where each game has at least one associated outcome that is predetermined by a central authority with an associated central management computer that authorizes game play on the remote game computer and provides for verification of any winnings represented by said at least one outcome after game play comprising:

at least one handheld ticket viewer including associated memory and processing means for executing at least one program from said associated memory, said at least one program including a game program, said processing means executing said game program to enable the player to play at least one game on said handheld ticket viewer upon receipt of outcome and game authorization data in response to a purchase request, said data representing at least one predetermined outcome where game play results in revealing said at least one predetermined outcome to the player; and a central management computer having associated memory, processing means for executing at least one program from said central management computer associated memory, and central management computer authentication means operatively associated therewith for generating and authenticating authenticable messages, said central management computer for enabling an authenticated session to communicate said data through a direct electronic connection to said handheld ticket viewer to enable said central management computer to authorize game play on said handheld ticket viewer while said handheld ticket viewer is off-line with respect to the central management computer during play, and to enable prize redemption after game play, said associated memory storing in association with the player an indication of at least one free game play authorization rewarded to the player in exchange for the player purchasing at least a predetermined total number of game plays, said central management computer being further operable in accordance with execution of the at least one program to authorize the at least one free game play authorization for the player.

2. The system of claim 1, wherein the at least one handheld ticket viewer comprises a cellular phone.

3. The system of claim 1, wherein the at least one handheld ticket viewer comprises a GPS receiver.

4. The system of claim 1, wherein the at least one predetermined outcome is determined prior to a purchase request.

5. The system of claim 1, wherein the at least one predetermined outcome is determined in response to a purchase request.

6. A method for playing games of chance on at least one remote game computer, where each game has at least one outcome that is predetermined by a central gaming authority having an associated central management computer prior to game play, comprising:

identifying a handheld ticket viewer to said central management computer;

requesting, by said handheld ticket viewer, a number of game authorizations from said central management computer;

receiving by said handheld ticket viewer via a direct electronic connection with said central management computer an authenticatable game authorization message formed by said central management computer and representing at least one predetermined outcome, after payment authorization for said authorized games by the player;

said game computer authenticating said authenticatable game authorization message and, if authenticated, said handheld ticket viewer revealing said at least one predetermined outcome represented in said authenticatable game authorization message while said handheld ticket viewer is off-line with respect to the central management computer; and said game computer awarding at least one free predetermined outcome to the player in exchange for the player purchasing at least a predetermined total number of game authorizations.

7. The method of claim 6, wherein the at least one handheld ticket viewer comprises a cellular phone.

8. The method of claim 6, wherein the at least one handheld ticket viewer comprises a GPS receiver.

9. The method of claim 6, wherein the at least one predetermined outcome is determined prior to a purchase request.

10. The method of claim 6, wherein the at least one predetermined outcome is determined in response to a purchase request.

* * * * *